US009279918B2

(12) United States Patent
Haag et al.

(10) Patent No.: US 9,279,918 B2
(45) Date of Patent: Mar. 8, 2016

(54) GRADIENT LOW INDEX ARTICLE AND METHOD

(75) Inventors: Adam D. Haag, Woodbury, MN (US); William F. Edmonds, Minneapolis, MN (US); Jason S. Petaja, Cottage Grove, MN (US); Eric W. Nelson, Stillwater, MN (US); William Blake Kolb, West Lakeland, MN (US); Encai Hao, Woodbury, MN (US); Fei Lu, Woodbury, MN (US); Michael Benton Free, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 696 days.

(21) Appl. No.: 13/501,295

(22) PCT Filed: Oct. 22, 2010

(86) PCT No.: PCT/US2010/053662
§ 371 (c)(1),
(2), (4) Date: Apr. 11, 2012

(87) PCT Pub. No.: WO2011/050228
PCT Pub. Date: Apr. 28, 2011

(65) Prior Publication Data
US 2012/0200931 A1    Aug. 9, 2012

Related U.S. Application Data

(60) Provisional application No. 61/254,673, filed on Oct. 24, 2009.

(51) Int. Cl.
G02B 5/02    (2006.01)
(52) U.S. Cl.
CPC ............ *G02B 5/0242* (2013.01); *G02B 5/0231* (2013.01); *G02B 5/0247* (2013.01); *G02B 5/0278* (2013.01); *Y10T 428/249961* (2015.04)

(58) Field of Classification Search
None
See application file for complete search history.

(56) References Cited

U.S. PATENT DOCUMENTS

| | | | |
|---|---|---|---|
| 5,919,555 | A | 7/1999 | Yasuda |
| 6,383,559 | B1 | 5/2002 | Nakamura |
| 6,719,426 | B2 | 4/2004 | Magarill |
| 6,924,014 | B2 | 8/2005 | Ouderkirk |
| 7,526,164 | B2 | 4/2009 | Ouderkirk |

(Continued)

FOREIGN PATENT DOCUMENTS

| | | |
|---|---|---|
| EP | 0989443 | 3/2000 |
| EP | 1022587 | 7/2000 |

(Continued)

OTHER PUBLICATIONS

Japanese Office Action dated Jun. 25, 2015, 3pgs.

*Primary Examiner* — Derek S Chapel
(74) *Attorney, Agent, or Firm* — Gregg H. Rosenblatt

(57) ABSTRACT

A gradient optical film and an optical construction including the gradient optical film are described. The gradient optical film includes a binder, a plurality of particles, and a plurality of interconnected voids having a local volume fraction. The local volume fraction of the plurality of interconnected voids varies along a thickness direction of the gradient optical film. The refractive index of the gradient optical film can also varies along a thickness direction of the gradient optical film, as the refractive index can also depend upon the local volume fraction of the plurality of interconnected voids.

16 Claims, 13 Drawing Sheets

(56) References Cited

U.S. PATENT DOCUMENTS

| | | |
|---|---|---|
| 7,599,592 B2 | 10/2009 | Benson |
| 2003/0077437 A1 | 4/2003 | Nakamura |
| 2005/0112296 A1 | 5/2005 | Laney |
| 2006/0194453 A1 | 8/2006 | Murakami |
| 2008/0064133 A1 | 3/2008 | Lee |
| 2009/0081429 A1 | 3/2009 | Lee |
| 2010/0209694 A1 | 8/2010 | Aoyama et al. |

FOREIGN PATENT DOCUMENTS

| | | |
|---|---|---|
| EP | 1089093 | 4/2001 |
| JP | H11-194204 | 7/1999 |
| WO | 2004-104113 | 12/2004 |
| WO | WO 2008-011919 | 1/2008 |
| WO | WO 2008-144636 | 11/2008 |
| WO | WO 2008-144644 | 11/2008 |
| WO | WO 2010-059566 | 5/2010 |
| WO | WO 2010-059568 | 5/2010 |
| WO | WO 2010-059579 | 5/2010 |
| WO | WO 2010-059614 | 5/2010 |
| WO | WO 2010-120422 | 10/2010 |
| WO | WO 2010-120468 | 10/2010 |
| WO | WO 2010-120845 | 10/2010 |
| WO | WO 2010-120864 | 10/2010 |
| WO | WO 2010-120871 | 10/2010 |
| WO | WO 2010-120971 | 10/2010 |
| WO | WO 2010-121019 | 10/2010 |
| WO | WO 2011-050226 | 4/2011 |
| WO | WO 2011-050232 | 4/2011 |
| WO | WO 2011-050254 | 4/2011 |
| WO | WO 2011-050268 | 4/2011 |

GRADIENT LOW INDEX ARTICLE AND METHOD

CROSS REFERENCE TO RELATED APPLICATIONS

This application is a national stage filing under 35 U.S.C. 371 of PCT/US2010/053662, filed Oct. 22, 2010, which claims priority to U.S. Application No. 61/254,673, filed Oct. 24, 2009, the disclosure of which is incorporated by reference in their entirety herein.

RELATED APPLICATIONS

This application is related to the following U.S. patent applications, filed on Apr. 15, 2009, and which are incorporated by reference: "Optical Construction and Display System Incorporating Same" 61/169,521; "Retroreflecting Optical Construction" 61/169,532; "Optical Film for Preventing Optical Coupling" 61/169,549; "Backlight and Display System Incorporating Same" 61/169,555; "Process and Apparatus for Coating with Reduced Defects" 61/169,427; and "Process and Apparatus for a Nanovoided Article" 61/169,429.

This application is also related to the following U.S. patent applications filed on an even date herewith, and which are incorporated by reference: "Process for Gradient Nanovoided Article" 61/254,674; "Immersed Reflective Polarizer with High Off-Axis Reflectivity" 61/254,691; "Immersed Reflective Polarizer with Angular Confinement in Selected Planes of Incidence" 61/254,692; and "Light Source and Display System Incorporating Same" 61/254,672.

BACKGROUND

Optical systems, such as retroreflecting or display systems, utilize one or more optical layers for managing incident light. Often, the optical layers are required to have a desired optical transmittance, optical haze, optical clarity, and index of refraction. In many applications, an air layer and a diffuser layer are incorporated into the optical system. Typically, the air layer supports total internal reflection and the diffuser layer provides optical diffusion.

SUMMARY

In one aspect, the present disclosure provides a gradient optical film including a binder and a plurality of particles, wherein a weight ratio of the binder to the plurality of the particles is not less than about 1:2. The gradient optical film further includes a plurality of interconnected voids having a local volume fraction, wherein the local volume fraction of the plurality of interconnected voids varies along a thickness direction of the gradient optical film.

In another aspect, the present disclosure provides an optical construction including a substrate and a gradient optical film. The gradient optical film includes a binder and a plurality of particles, wherein a weight ratio of the binder to the plurality of the particles is not less than about 1:2. The gradient optical film further includes a plurality of interconnected voids having a local volume fraction, wherein the local volume fraction of the plurality of interconnected voids varies along a thickness direction of the gradient optical film.

In yet another aspect, the present disclosure provides a gradient optical film that includes a binder, a plurality of elongated particles, and a plurality of interconnected voids, wherein a local volume fraction of the plurality of interconnected voids varies along a thickness direction of the gradient optical film. Further, a first local volume fraction of the plurality of interconnected voids proximate a first surface of the gradient optical film, is greater than a second local volume fraction of the plurality of interconnected voids proximate an opposing surface of the gradient optical film.

In yet another aspect, the present disclosure provides a gradient optical film that includes a plurality of elongated particles and a plurality of voids, wherein a local volume fraction of the plurality of interconnected voids varies along a thickness direction of the gradient optical film. Further, the gradient optical film has a first index of refraction proximate a first surface of the gradient optical film that is lower than a second index of refraction proximate an opposing surface of the gradient optical film, and the first index of refraction is not greater than about 1.3.

In yet another aspect, the present disclosure provides an optical construction that includes a structured surface including a plurality of structures, and a gradient optical film coated on and substantially planarizing the structured surface, the gradient optical film. The gradient optical film further includes a plurality of interconnected voids, wherein a local volume fraction of the plurality of interconnected voids varies along a thickness direction of the gradient optical film. Further, a first local volume fraction of the plurality of interconnected voids proximate the plurality of structures is greater than a second local volume fraction of the plurality of interconnected voids proximate an opposing surface of the gradient optical film.

In yet another aspect, the present disclosure provides an optical construction including an optical diffuser layer having an optical haze that is not less than about 30%, a gradient optical film disposed on the optical diffuser layer, and a reflective polarizer layer disposed on the gradient optical film, wherein substantial portions of each two neighboring major surfaces in the optical construction are in physical contact with each other. Further, the gradient optical film includes a binder, a plurality of particles, and a plurality of interconnected voids having a local volume fraction, wherein the local volume fraction of the plurality of interconnected voids varies along a thickness direction of the gradient optical film.

In yet another aspect, the present disclosure provides an optical construction including a brightness enhancing film (BEF) including a plurality of parallel prisms, and a gradient optical film coated on and substantially planarizing the BEF. Further, the gradient optical film includes a plurality of interconnected voids, wherein a local volume fraction of the plurality of interconnected voids varies along a thickness direction of the gradient optical film. Still further, a first local volume fraction of the plurality of interconnected voids proximate the plurality of parallel prisms is greater than a second local volume fraction of the plurality of interconnected voids proximate an opposing surface of the gradient optical film.

In yet another aspect, the present disclosure provides a gradient optical film that includes a binder and a plurality of particles, wherein a weight ratio of the binder to the plurality of particles is not less than about 1:2, and wherein a refractive index varies along a thickness direction of the gradient optical film.

In yet another aspect, the present disclosure provides an optical construction that includes an optical diffuser layer having an optical haze that is not less than about 30% and a gradient optical film disposed on the optical diffuser layer. The gradient optical film includes a binder and a plurality of particles, wherein a refractive index varies along a thickness direction of the gradient optical film. Further, the optical construction includes a reflective polarizer layer disposed on the gradient optical film, wherein substantial portions of each two neighboring major surfaces in the optical construction are in physical contact with each other.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
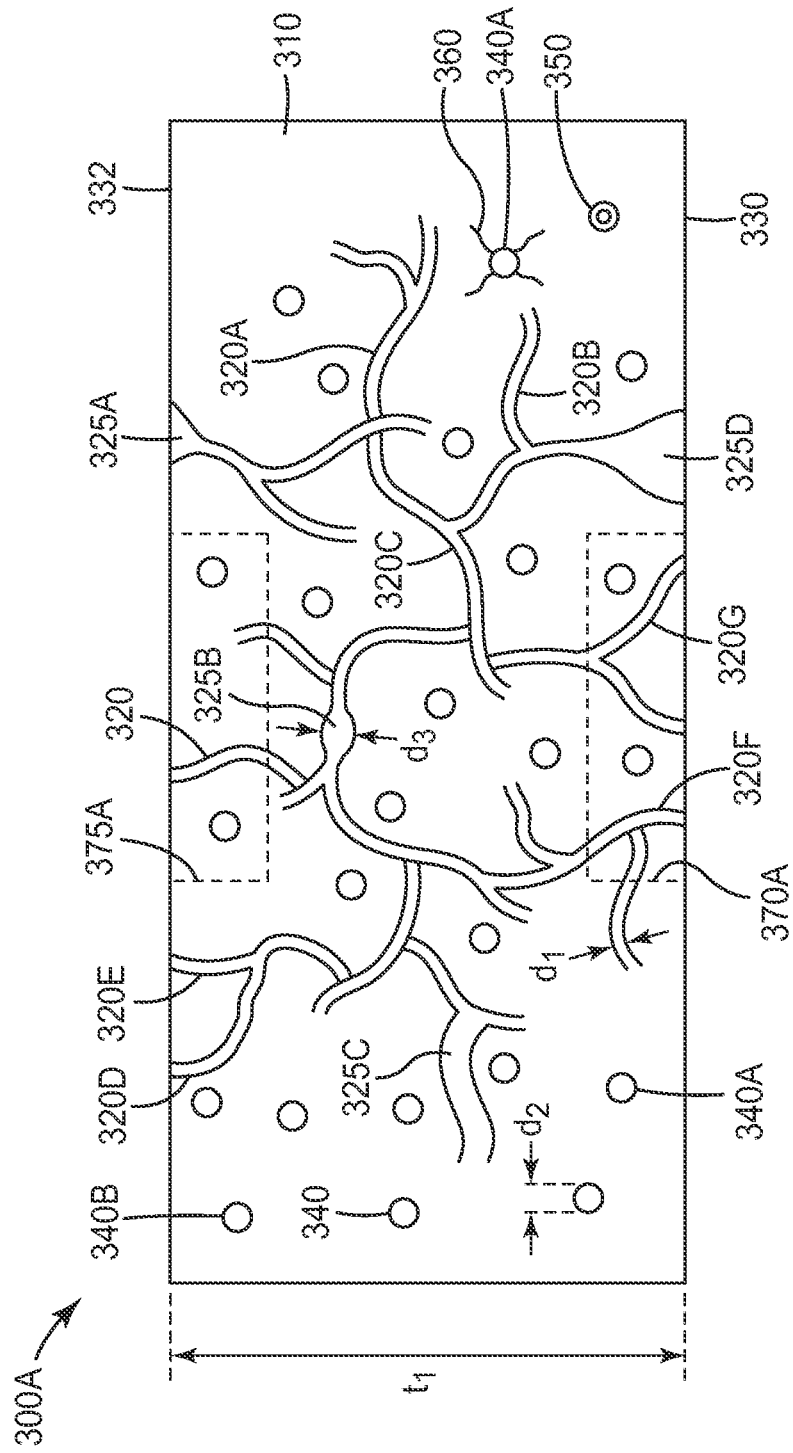
FIG. 1A-1G are schematic side-views of gradient optical films.

This invention generally relates to optical films that exhibit some low-index-like optical properties. In one particular embodiment, the optical films can exhibit low-index-like optical properties that vary along a thickness direction of the optical films, that is, gradient optical films. Some disclosed gradient optical films exhibit a local porosity that varies along a thickness direction of the gradient optical films. In some cases, the local porosity may be described by a local void volume fraction, or as a local pore size distribution.

Some disclosed gradient optical films have a low optical haze and a low effective index of refraction, such as an optical haze of less than about 5% and an effective index of refraction that is less than about 1.35. Some disclosed gradient optical films have a high optical haze, such as an optical haze of greater than about 50%, and/or high diffuse optical reflectance while manifesting some low-index-like optical properties, such as, for example, the ability to support total internal reflection or enhance internal reflection. In some cases, the disclosed gradient optical films can be incorporated in various optical or display systems such as, for example, a general lighting system, a liquid crystal display system, or a retro-reflecting optical system to improve system durability, reduce manufacturing cost, and reduce the overall thickness of the system while improving, maintaining or substantially maintaining at least some of the system optical properties such as, for example, the retro-reflectivity of the system or the on-axis brightness and contrast of an image displayed by the system.

The gradient optical films disclosed herein, typically include a plurality of interconnected voids or a network of voids dispersed in a binder. At least some of the voids in the plurality or network are connected to one another via hollow tunnels or hollow tunnel-like passages. The voids are not necessarily free of all matter and/or particulates. For example, in some cases, a void may include one or more small fiber- or string-like objects that include, for example, a binder and/or nano-particles. In some cases, a void may include particles or particle agglomerates that may be attached to the binder, or may be loose within the void. Some disclosed gradient optical films include multiple pluralities of interconnected voids or multiple networks of voids where the voids in each plurality or network are interconnected. In some cases, in addition to multiple pluralities of interconnected voids, the disclosed gradient optical films include a plurality of closed or unconnected voids meaning that the voids are not connected to other voids via tunnels.

In some cases, the gradient optical films can improve the durability of similar optical films that do not have a gradient structure. In some cases, one surface of the gradient optical film may resist abrasion due to, for example, a densified surface or a toughened surface. In some cases, the gradient optical films may exhibit improved environmental stability, since a sealed or a densified surface may prevent contaminants from entering the interior of the gradient optical film. In some cases, a sealed or densified surface may enhance cleanliness of the gradient optical films, since particles entrained within interior pores may become trapped such that mechanical forces may be unable to remove them.

In one particular embodiment, the gradient optical films can include a plurality of interconnected voids or a network of voids having a local volume fraction that varies along a thickness direction of the gradient optical film. As used herein, "local volume fraction" means the volume fraction of a component (e.g., the plurality of interconnected voids) measured on a local scale, for example, in a region less than about 10%, or less than about 5%, or less than about 3%, or less than about 1% of the total thickness of the gradient optical film. The local volume fraction of interconnected voids can vary across the thickness of the gradient optical film, such that the local volume fraction of interconnected voids proximate one surface of the film can be greater or less than the local volume fraction of interconnected voids proximate an opposing surface of the gradient optical film. The bulk volume fraction of interconnected voids is the ratio of the volume of voids in the optical film to the total volume of the optical film.

In some cases, the local volume fraction of interconnected voids can be close to zero proximate one surface of the film (that is, there are very few interconnected voids), and the film can be said to be essentially "sealed" on that surface of the film. In some cases, the local volume fraction of interconnected voids can vary in a continuous manner throughout the film, such as either a monotonic increase or decrease in the local volume fraction across the thickness direction of the gradient optical film. In some cases, the local volume fraction of interconnected voids can go through a local maximum or a local minimum in the volume fraction of interconnected voids across the thickness direction of the gradient optical film. In some cases, the local volume fraction of interconnected voids can vary in a discontinuous manner along the thickness direction of the gradient optical film, for example, a step-change in the local volume fraction of interconnected voids.

Control of the local volume fraction of interconnected voids can be useful in several applications including, for example, when a material is coated on a surface of the gradient optical film. In some cases, the coated material may include a solvent or other high mobility component such as, for example, a low molecular weight curable material, which can penetrate the interconnected voids of the gradient optical film. In some cases, the coated material may include a thermoplastic solid or a gelled material, such as a transfer adhesive or a pressure sensitive adhesive (PSA) that, upon thermal cycling or aging, can penetrate into the porous structure of interconnected voids. Penetration of a material into the interconnected voids of the gradient optical film can alter properties of the film, including, for example, increasing the refractive index at in the penetration region.

In one particular embodiment, a change in the local volume fraction of the interconnected voids can provide control over this penetration proximate one surface of the gradient optical film, while maintaining a desired local volume fraction of the interconnected voids proximate an opposing surface of the gradient optical film. In some cases, the local volume fraction of interconnected voids proximate one surface of the gradient optical film can be lower than the bulk volume fraction of interconnected voids and also lower than the local volume fraction proximate the opposing surface of the gradient optical film. In some cases, the local volume fraction of interconnected voids can be decreased so that only limited infusion can take place. Limited infusion of material to form a gradient optical film can be useful, for example, to strengthen a surface of a fragile optical film that has a high bulk volume fraction of interconnected voids. In some cases, a lower volume fraction of interconnected voids in a gradient optical film can improve the structural integrity, that is, the durability of the optical film.

In some cases, the local volume fraction of interconnected voids can be decreased to near zero local volume fraction of interconnected voids, effectively sealing the surface. Control of the local volume fraction of interconnected voids can include techniques such as, for example, inhibiting or promoting the rate and extent of cure on one or more surface of the gradient optical film, infusion of a material to at least partially fill a portion of the voids, and the like. In general, control over the local volume fraction of interconnected voids can be accomplished by techniques described elsewhere, including, for example, in co-pending application Ser. No. 61/254,674, entitled "PROCESS FOR GRADIENT NANO-VOIDED ARTICLE", filed on an even date herewith.

Some disclosed gradient optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided gradient optical film enhancing internal reflection (EIR), it is meant that the reflectance at the boundary of the voided and non-voided strata of the film or film laminate is greater with the voids than without the voids.

The voids in the disclosed gradient optical films have an index of refraction $n_v$ and a permittivity $\varepsilon_v$, where $n_v^2 = \varepsilon_v$, and the binder has an index of refraction $n_b$ and a permittivity $\varepsilon_b$, where $n_b^2 = \varepsilon_b$. In general, the interaction of a gradient optical film with light, such as light that is incident on, or propagates in, the gradient optical film, depends on a number of film characteristics such as, for example, the film thickness, the binder index, the void or pore index, the pore shape and size, the spatial distribution of the pores, and the wavelength of light. In some cases, light that is incident on or propagates within the gradient optical film, "sees" or "experiences" an effective permittivity $\varepsilon_{eff}$ and an effective index $n_{eff}$, where $n_{eff}$ can be expressed in terms of the void index $n_v$, the binder index $n_b$, and the void porosity or volume fraction "f". In such cases, the gradient optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on a disclosed gradient optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the gradient optical film has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed gradient optical films are sufficiently thick so that the gradient optical film can reasonably have an effective index that can be expressed in terms of the indices of refraction of the voids and the binder, and the void or pore volume fraction or porosity. In such cases, the thickness of the gradient optical film is not less than about 100 nm, or not less than about 200 nm, or not less than about 500 nm, or not less than about 700 nm, or not less than about 1,000 nm.

When the voids in a disclosed gradient optical film are sufficiently small and the gradient optical film is sufficiently thick, the gradient optical film has an effective permittivity $\varepsilon_{eff}$ that can be expressed as:

$$\varepsilon_{eff} = f\varepsilon_v + (1-f)\varepsilon_b \quad (1)$$

In such cases, the effective index $n_{eff}$ of the gradient optical film can be expressed as:

$$n_{eff}^2 = fn_v^2 + (1-f)n_b^2 \quad (2)$$

In some cases, such as when the difference between the indices of refraction of the pores and the binder is sufficiently small, the effective index of the gradient optical film can be approximated by the following expression:

$$n_{eff} = fn_v + (1-f)n_b \quad (3)$$

In such cases, the effective index of the gradient optical film is the volume weighted average of the indices of refraction of the voids and the binder. For example, an gradient optical film that has a void volume fraction of about 50% and a binder that has an index of refraction of about 1.5, has an effective index of about 1.25.

FIG. 1A is a schematic side-view of a gradient optical film 300A that includes a network of voids or plurality of interconnected voids 320 and a plurality of particles 340 dispersed substantially uniformly within a binder 310. Gradient optical film 300A has a porous interior by virtue of the presence of network of voids 320 within the gradient optical film. In general, the gradient optical film can include one or more networks of interconnected pores or voids. For example, network of voids 320 can be regarded to include interconnected voids or pores 320A-320C. A local volume fraction of interconnected voids, for example a first local volume fraction of interconnected voids 370A and a second volume fraction of interconnected voids 375A, can vary along a thickness $t_1$ direction within gradient optical film 300A. The local volume fraction of interconnected voids, and void size distribution, can vary along the thickness direction in several ways as shown, for example, in FIGS. 1B-1G, described elsewhere. In some cases, the gradient optical film is a porous film meaning that the network of voids 320 forms one or more passages between first and second major surfaces 330 and 332, respectively.

The network of voids can be regarded to include a plurality of interconnected voids. Some of the voids can be at a surface of the gradient optical film and can be regarded to be surface voids. For example, in the exemplary gradient optical film 300A, voids 320D and 320E are at a second major surface 332 of the gradient optical film and can be regarded as surface voids 320D and 320E, and voids 320F and 320G are at a first major surface 330 of the gradient optical film and can be regarded as surface voids 320F and 320G. Some of the voids, such as for example voids 320B and 320C, are within the interior of the gradient optical film and away from the exterior surfaces of the gradient optical film and can be regarded as interior voids 320B and 320C, even though an interior void can be connected to a major surface via, for example, other voids.

Voids 320 have a size $d_1$ that can generally be controlled by choosing suitable composition and fabrication techniques, such as coating, drying and curing conditions. In general, $d_1$ can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, plurality of interconnected voids 320 has an average void or pore size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, some of the voids can be sufficiently small so that their primary optical effect is to reduce the effective index, while some other voids can reduce the effective index and scatter light, while still some other voids can be sufficiently large so that their primary optical effect is to scatter light.

Particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, plurality of particles 340 has an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, some of the particles can be sufficiently small so that they primary affect the effective index, while some other particles can affect the effective index and scatter light, while still some other particles can be sufficiently large so that their primary optical effect is to scatter light.

In some cases, $d_1$ and/or $d_2$ are sufficiently small so that the primary optical effect of the voids and the particles is to affect the effective index of gradient optical film 300A. For example, in such cases, $d_1$ and/or $d_2$ are not greater than about 215, or not greater than about 216, or not greater than about 218, or not greater than about $\lambda/10$, or not greater than about $\lambda/20$, where $\lambda$, is the wavelength of light. As another example, in such cases, $d_1$ and $d_2$ are not greater than about 70 nm, or not greater than about 60 nm, or not greater than about 50 nm, or not greater than about 40 nm, or not greater than about 30 nm, or not greater than about 20 nm, or not greater than about 10 nm. In such cases, the voids and the particles may also scatter light, but the primary optical effect of the voids and the particles is to define an effective medium in the gradient optical film that has an effective index. The effective index depends, in part, on the indices of refraction of the voids, the binder, and the particles. In some cases, the effective index is a reduced effective index, meaning that the effective index is less than the index of the binder and the index of the particles.

In cases where the primary optical effect of the voids and/or the particles is to affect the index, $d_1$ and $d_2$ are sufficiently small so that a substantial fraction, such as at least about 60%, or at least about 70%, or at least about 80%, or at least about 90%, or at least about 95% of voids 320 and particles 340 have the primary optical effect of reducing the effective index. In such cases, a substantial fraction, such as at least about 60%, or at least about 70%, or at least about 80%, or at least about 90%, or at least about 95% the voids and/or the particles, have a size that is in a range from about 1 nm to about 200 nm, or from about 1 nm to about 150 nm, or from about 1 nm to about 100 nm, or from about 1 nm to about 50 nm, or from about 1 nm to about 20 nm.

In some cases, the index of refraction $n_1$ of particles 340 can be sufficiently close to the index $n_b$ of binder 310, so that the effective index does not depend, or depends very little, on the index of refraction of the particles. In such cases, the difference between $n_1$ and $n_b$ is not greater than about 0.01, or not greater than about 0.007, or not greater than about 0.005, or not greater than about 0.003, or not greater than about 0.002, or not greater than about 0.001. In some cases, particles 340 are sufficiently small and their index is sufficiently close to the index of the binder, that the particles do not primarily scatter light or affect the index. In such cases, the primary effect of the particles can, for example, be to enhance the strength of gradient optical film 300A. In some cases, particles 340 can enhance the process of making the gradient optical film, although gradient optical film 300A can be made with no particles.

In cases where the primary optical effect of network of voids 320 and particles 340 is to affect the effective index and not to, for example, scatter light, the optical haze of gradient optical film 300A that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the gradient optical film is not greater than about 1.35, or not greater than about 1.3, or not greater than about 1.25, or not greater than about 1.2, or not greater than about 1.15, or not greater than about 1.1, or not greater than about 1.05.

In cases where gradient optical film 300A can reasonably have a reduced effective index, the thickness of the gradient optical film is not less than about 100 nm, or not less than about 200 nm, or not less than about 500 nm, or not less than about 700 nm, or not less than about 1,000 nm, or not less than about 1500 nm, or not less than about 2000 nm.

In some cases, $d_1$ and/or $d_2$ are sufficiently large so that their primary optical effect is to scatter light and produce optical haze. In such cases, $d_1$ and/or $d_2$ are not less than about 200 nm, or not less than about 300 nm, or not less than about 400 nm, or not less than about 500 nm, or not less than about 600 nm, or not less than about 700 nm, or not less than about 800 nm, or not less than about 900 nm, or not less than about 1000 nm. In such cases, the voids and the particles may also affect the index, but their primarily optical effect is to scatter light. In such cases, light incident on the gradient optical film can be scattered by both the voids and the particles.

Gradient optical film 300A can be used in many optical applications. For example, in some cases, the gradient optical film can be used to support or promote total internal reflection (TIR) or enhance internal reflection meaning that the reflection is greater than what a material with index $n_b$ would produce. In such cases, gradient optical film 300A is sufficiently thick so that the evanescent tail of a light ray that undergoes total internal reflection at a surface of the gradient optical film, does not optically couple, or optically couples very little, across the thickness of the gradient optical film. In such cases, the thickness $t_1$ of gradient optical film 300A is not less than about 1 micron, or not less than about 1.1 micron, or not less than about 1.2 microns, or not less than about 1.3 microns, or not less than about 1.4 microns, or not less than about 1.5 microns, or not less than about 1.7 microns, or not less than about 2 microns. A sufficiently thick gradient optical film 300A can prevent or reduce an undesired optical coupling of the evanescent tail of an optical mode across the thickness of the gradient optical film.

In some cases, gradient optical film 300A has a low optical haze. In such cases, the optical haze of the gradient optical film is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the gradient optical film can have a reduced effective index that is not greater than about 1.35, or not greater than about 1.3, or not greater than about 1.2, or not greater than about 1.15, or not greater than about 1.1, or not greater than about 1.05. For light normally incident on gradient optical film 300A, optical haze, as used herein, is defined as the ratio of the transmitted light that deviates from the normal direction by more than 4 degrees to the total transmitted light. Haze values disclosed herein were measured using a Haze-Gard Plus haze meter (BYK-Gardner, Silver Springs, Md.) according to the procedure described in ASTM D1003.

In some cases, gradient optical film 300A has a high optical haze. In such cases, the haze of the gradient optical film is not less than about 40%, or not less than about 50%, or not less than about 60%, or not less than about 70%, or not less than about 80%, or not less than about 90%, or not less than about 95%. In some cases, gradient optical film 300A can have an intermediate optical haze, for example, between about 5% and about 50% optical haze.

In some cases, gradient optical film 300A has a high diffuse optical reflectance. In such cases, the diffuse optical reflectance of the gradient optical film is not less than about 30%, or not less than about 40%, or not less than about 50%, or not less than about 60%.

In some cases, gradient optical film 300A has a high optical clarity. For light normally incident on gradient optical film 300A, optical clarity, as used herein, refers to the ratio $(T_2-T_1)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardner. In the cases where gradient optical film 300A has a high optical clarity, the clarity is not less than about 40%, or not less than about 50%, or not less than about 60%, or not less than about 70%, or not less than about 80%, or not less than about 90%, or not less than about 95%.

In some cases, gradient optical film 300A has a low optical clarity. In such cases, the optical clarity of the gradient optical film is not greater than about 10%, or not greater than about 7%, or not greater than about 5%, or not greater than about 4%, or not greater than about 3%, or not greater than about 2%, or not greater than about 1%.

In general, gradient optical film can have any porosity or void volume fraction that may be desirable in an application. In some cases, the volume fraction of plurality of voids 320 in gradient optical film 300A is not less than about 20%, or not less than about 30%, or not less than about 40%, or not less than about 50%, or not less than about 60%, or not less than about 70%, or not less than about 80%, or not less than about 90%.

In some cases, gradient optical film can manifest some low-index properties, even if the gradient optical film has a high optical haze and/or diffuse reflectance. For example, in such cases, the gradient optical film can support TIR at angles that correspond to an index that is smaller than the index $n_b$ of binder 310.

In the exemplary gradient optical film 300A, particles 340, such as particles 340A and 340B, are solid particles. In some cases, gradient optical film 300A may additionally or alternatively include a plurality of hollow or porous particles 350.

Particles 340 can be any type particles that may be desirable in an application. For example, particles 340 can be organic or inorganic particles. For example, particles 340 can be silica, zirconium oxide or alumina particles.

Particles 340 can have any shape that may be desirable or available in an application. For example, particles 340 can have a regular or irregular shape. For example, particles 340 can be approximately spherical. As another example, the particles can be elongated. In such cases, gradient optical film 300A includes a plurality of elongated particles 340B. In some cases, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles can be in the form or shape of a string-of-pearls (such as Snowtex-PS particles available from Nissan Chemical, Houston, Tex.) or aggregated chains of spherical or amorphous particles, such as fumed silica.

Particles 340 may or may not be functionalized. In some cases, particles 340 are not functionalized. In some cases, particles 340 are functionalized so that they can be dispersed in a desired solvent or binder 310 with no, or very little, clumping. In some cases, particles 340 can be further functionalized to chemically bond to binder 310. For example, particles 340, such as particle 340A, can be surface modified and have reactive functionalities or groups 360 to chemically bond to binder 310. In such cases, at least a significant fraction of particles 340 is chemically bound to the binder. In some cases, particles 340 do not have reactive functionalities to chemically bond to binder 310. In such cases, particles 340 can be physically bound to binder 310, or binder 310 can encapsulate particles 340.

In some cases, some of the particles have reactive groups and others do not have reactive groups. For example in some cases, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some cases, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

Binder 310 can be or include any material that may be desirable in an application. For example, binder 310 can be a curable material that forms a polymer, such as a cross-linked polymer. In general, binder 310 can be any polymerizable material, such as a polymerizable material that is radiation-curable, such as a UV curable material.

Gradient optical film 300A can be produced using any method that may be desirable in an application. In some cases, gradient optical film 300A can be produced by the processes described in co-pending application titled "PROCESS AND APPARATUS FOR A NANOVOIDED ARTICLE", 61/169,429, co-pending application titled "PROCESS AND APPARATUS FOR COATING WITH REDUCED DEFECTS", 61/169,427, and co-pending application titled "PROCESS FOR GRADIENT NANOVOIDED ARTICLE", 61/254,674, the disclosures of which are incorporated in their entirety herein by reference.

Generally, in one process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. In one particular embodiment, the polymerization occurs in an environment that has an elevated level of oxygen adjacent one of the surfaces, inhibiting the polymerization near that surface to create a gradient optical film. In one particular embodiment, a concentration of photoinitiator near one of the surfaces is increased relative to another surface, to create a gradient optical film. Other techniques for creating a gradient optical film are described in co-pending application titled "PROCESS FOR GRADIENT NANOVOIDED ARTICLE", 61/254,674.

In some cases, after the polymerization step, the solvent may still include some of the polymerizable material, although at a lower concentration. Next, the solvent is removed by drying or evaporating the solution resulting in gradient optical film 300A that includes a network, or a plurality, of voids 320 dispersed in polymer binder 310. The gradient optical film further includes plurality of particles 340 dispersed in the polymer. The particles are bound to the binder, where the bonding can be physical or chemical, or be encapsulated by the binder.

Gradient optical film 300A can have other materials in addition to binder 310 and particles 340. For example, gradient optical film 300A can include one or more additives, such as for example, coupling agents, to help wet the surface of a substrate, not expressly shown in FIG. 1, on which the gradient optical film is formed. As another example, gradient optical film 300A can include one or more colorants, such a carbon black, for imparting a color, such as the black color, to the gradient optical film. Other exemplary materials in gradient optical film 300A include initiators, such as one or more photo-initiators, anti-stats, UV absorbers and release agents. In some cases, gradient optical film 300A can include a down converting material that is capable of absorbing light and reemitting a longer wavelength light. Exemplary down converting materials include phosphors.

In general, gradient optical film 300A can have a desirable porosity for any weight ratio of binder 310 to plurality of particles 340. Accordingly, in general, the weight ratio can be any value that may be desirable in an application. In some cases, the weight ratio of binder 310 to plurality of particles 340 is not less than about 1:2.5, or not less than about 1:2.3, or not less than about 1:2, or not less than about 1:1, or not less than about 1.5:1, or not less than about 2:1, or not less than about 2.5:1, or not less than about 3:1, or not less than about 3.5:1, or not less than about 4:1, or not less than about 5:1. In some cases, the weight ratio is in a range from about 1:2.3 to about 4:1.

In some cases, top major surface 332 of gradient optical film 300A can be treated to, for example, improve the adhesion of the gradient optical film to another layer. For example, the top surface can be corona treated.

FIGS. 1B-1G are schematic side-views of a gradient optical film 300B-300G, respectively, according to different aspects of the disclosure. For clarity, the numbered elements 310-360 and the sizes $d_1$-$d_3$ described for FIG. 1A are not shown in FIGS. 1B-1G; however, each of the descriptions provided for gradient optical film 300A of FIG. 1A also correspond to the gradient optical film 300B-300 of FIGS. 1B-1G, respectively. Techniques for creating the gradient optical films 300B-300G are described, for example, in co-pending application titled "PROCESS FOR GRADIENT NANOVOIDED ARTICLE", 61/254,674.

Figure 1B:
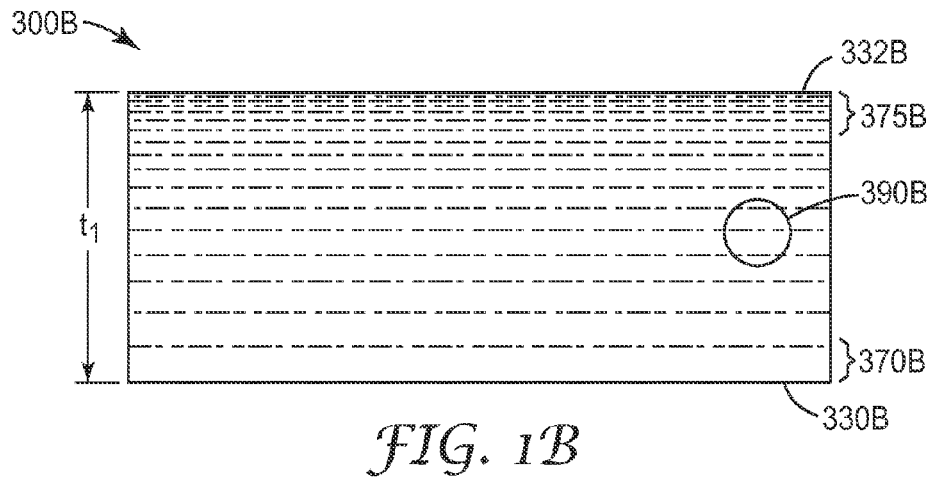

In FIG. 1B, gradient optical film 300B includes a local volume fraction of interconnected voids 390B that varies along the thickness direction, for example, in a monotonic manner as shown. In one particular embodiment, a first local volume fraction of interconnected voids 370B proximate a first surface 330B of gradient optical film 300B is lower than a second local volume fraction of interconnected voids 375B proximate a second surface 332B of gradient optical film 300B.

Gradient optical film 300B can be prepared using a variety of techniques, as described elsewhere. In one particular embodiment, gradient optical film 300B can be prepared, for example, using an absorbance based technique where the intensity of polymerization light decreases from first surface 330B to second surface 332B.

Figure 1C:
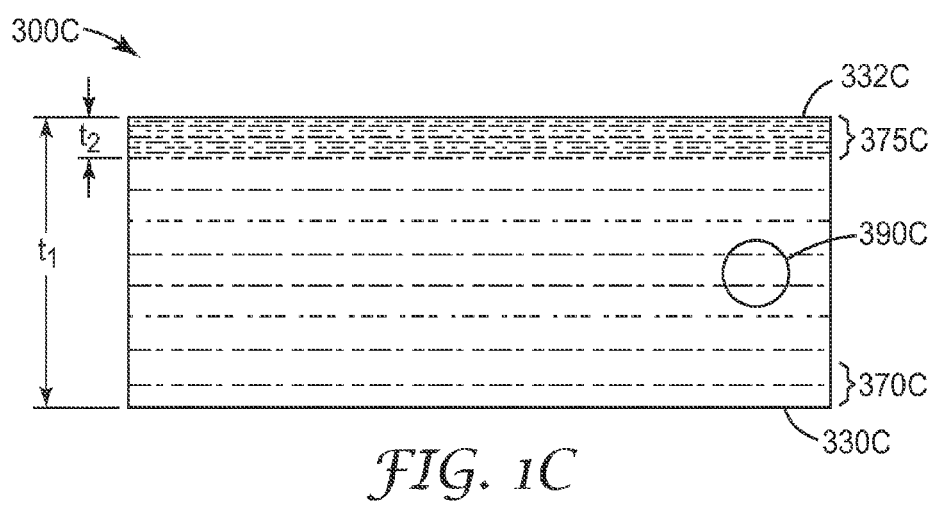

In FIG. 1C, gradient optical film 300C includes a local volume fraction of interconnected voids 390C that varies along the thickness direction, for example, in a step-wise manner as shown. In one particular embodiment, a first local volume fraction of interconnected voids 370C proximate a first surface 330C of gradient optical film 300C is lower than a second local volume fraction of interconnected voids 375C proximate a second surface 332C of gradient optical film 300C. In some cases, for example, shown FIG. 1C, first local volume fraction of interconnected voids 370C transitions sharply (that is, step-wise) to second local volume fraction of interconnected voids 375C. In some cases, a thickness $t_2$ of the second volume fraction of interconnected voids 375C can be a small percentage of the total thickness $t_1$, for example, from about 1% to about 5%, or to about 10%, or to about 20%, or to about 30% or more of the total thickness $t_1$.

Gradient optical film 300C can be prepared using a variety of techniques, as described elsewhere. In one particular embodiment, gradient optical film 300C can be prepared, for example, by using a difference in the polymerization initiator concentration or a difference in the polymerization inhibitor concentration proximate the first and second surfaces (330C, 332C).

Figure 1D:
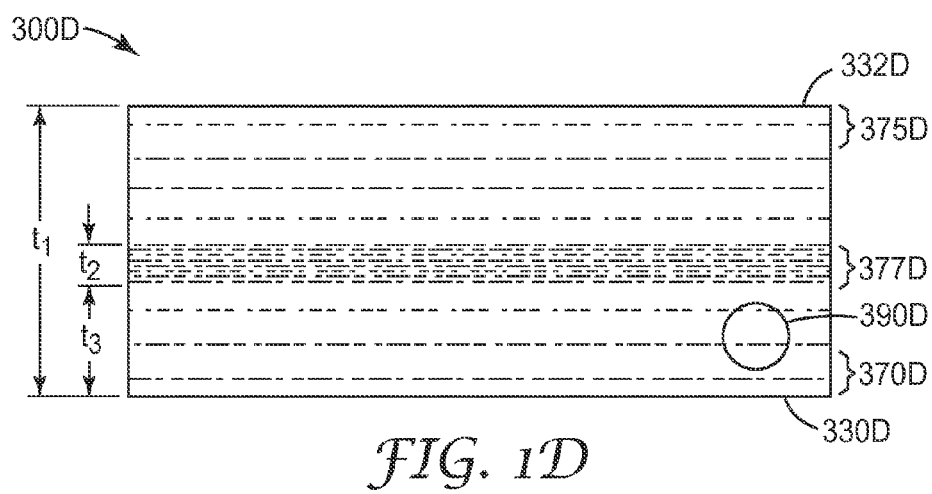

In FIG. 1D, gradient optical film 300D includes a local volume fraction of interconnected voids 390D that varies along the thickness direction, for example, having a minimum local volume fraction of interconnected voids 377D as shown. In one particular embodiment, a first local volume fraction of interconnected voids 370D proximate a first surface 330D of gradient optical film 300D is approximately the same as a second local volume fraction of interconnected voids 375D proximate a second surface 332D of gradient optical film 300D. In some cases, for example, shown FIG. 1D, first local volume fraction of interconnected voids 370D transitions sharply (that is, step-wise) to minimum local volume fraction of interconnected voids 377D. In some cases, a thickness $t_2$ of the minimum volume fraction of interconnected voids 377D can be a small percentage of the total thickness $t_1$, for example, from about 1% to about 5%, or to about 10%, or to about 20%, or to about 30% or more of the total thickness $t_1$. In some cases, the relative position of the minimum local volume fraction of interconnected voids 377D can be located anywhere, for example, at thickness $t_3$ from first surface 330D, within gradient optical film 300D.

Gradient optical film 300D can be prepared using a variety of techniques, as described elsewhere. In one particular embodiment, gradient optical film 300D can be prepared, for example, by laminating a pair of the gradient optical films 300C shown in FIG. 1C to each other, along the second surfaces 332C.

Figure 1E:
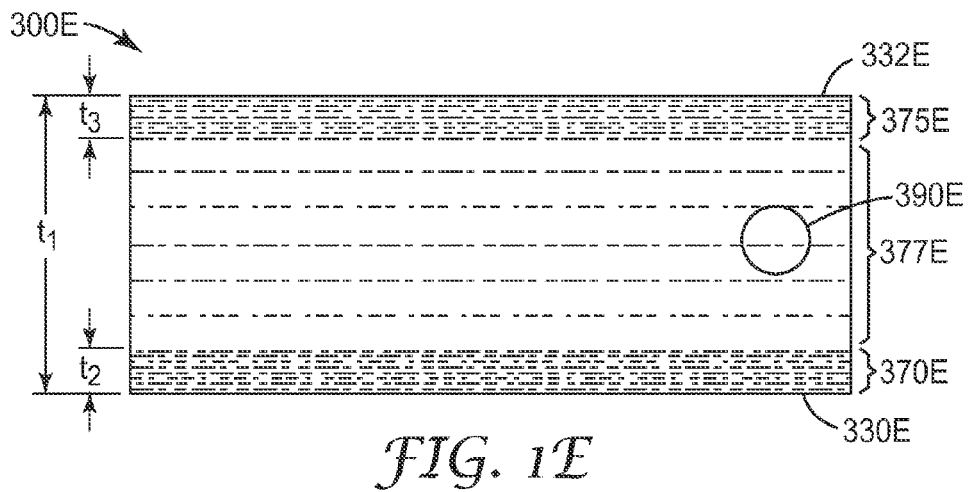

In FIG. 1E, gradient optical film 300E includes a local volume fraction of interconnected voids 390E that varies along the thickness direction, for example, having a step-change local volume fraction of interconnected voids proximate a first and second surface 330E, 332E, as shown. In one particular embodiment, a first local volume fraction of interconnected voids 370E proximate a first surface 330E of gradient optical film 300E is approximately the same as a second local volume fraction of interconnected voids 375E proximate a second surface 332E of gradient optical film 300E. In some cases, for example, shown FIG. 1E, first local volume fraction of interconnected voids 370E transitions sharply (that is, step-wise) to maximum local volume fraction of interconnected voids 377E. In some cases, a thickness $t_2$ and $t_3$ of the first and second local volume fraction of interconnected voids 370E and 375E, respectively, can be a small percentage of the total thickness $t_1$, for example, from about 1% to about 5%, or to about 10%, or to about 20%, or to about 30% or more of the total thickness $t_1$. In some cases, each of the first and second local volume fraction of interconnected voids 370E and 375E can have transitions that are not step-wise (not shown, but similar to the monotonic variation shown in FIG. 1B).

Gradient optical film 300E can be prepared using a variety of techniques, as described elsewhere. In one particular embodiment, gradient optical film 300E can be prepared, for example, by laminating a pair of the gradient optical films 300C shown in FIG. 1C to each other, along the first surfaces 330C.

Figure 1F:
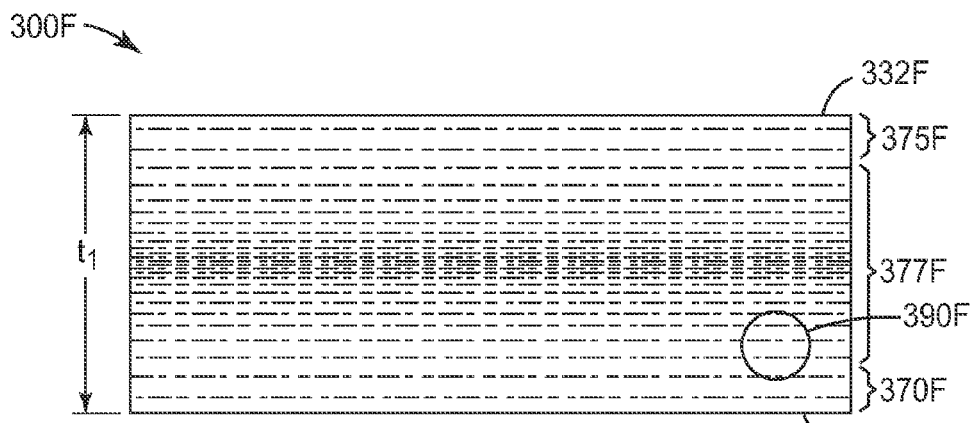

In FIG. 1F, gradient optical film 300F includes a local volume fraction of interconnected voids 390F that varies along the thickness direction, for example, having a gradient minimum local volume fraction of interconnected voids 377F as shown. In one particular embodiment, a first local volume fraction of interconnected voids 370F proximate a first surface 330F of gradient optical film 300F is approximately the same as a second local volume fraction of interconnected voids 375F proximate a second surface 332F of gradient optical film 300F. In some cases, for example, shown FIG. 1F, first local volume fraction of interconnected voids 370F transitions gradually (that is, in a monotonic gradient) to a minimum local volume fraction of interconnected voids 377F, and again transitions gradually to the second volume fraction of interconnected voids 375F.

Gradient optical film 300F can be prepared using a variety of techniques, as described elsewhere. In one particular embodiment, gradient optical film 300F can be prepared, for example, by laminating a pair of the gradient optical films 300B shown in FIG. 1B to each other, along the second surfaces 332B.

Figure 1G:
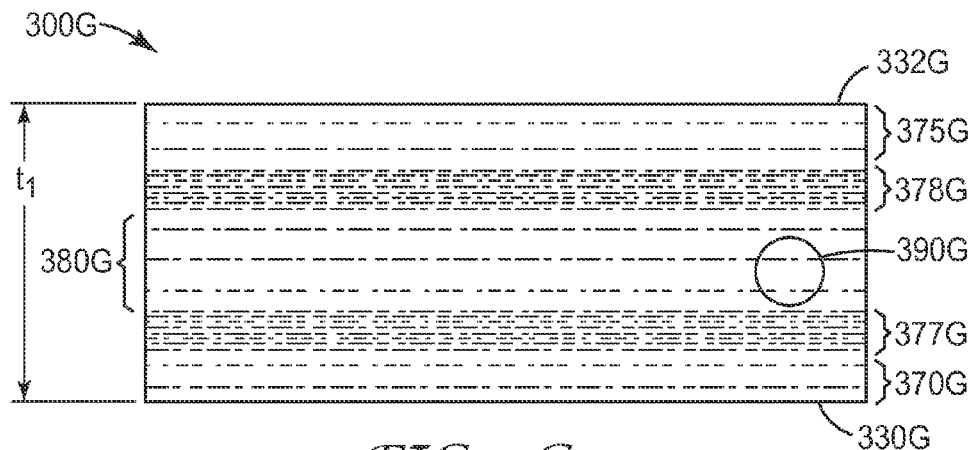

In FIG. 1G, gradient optical film 300G includes a local volume fraction of interconnected voids 390G that varies along the thickness direction, for example, having a pair of step-change local volume fraction of interconnected voids 377G, 378G, as shown. In one particular embodiment, a first local volume fraction of interconnected voids 370G proximate a first surface 330G of gradient optical film 300G is approximately the same as a second local volume fraction of interconnected voids 375G proximate a second surface 332G of gradient optical film 300G. In some cases, for example, shown FIG. 1G, first local volume fraction of interconnected voids 370E transitions sharply (that is, step-wise) to minimum local volume fraction of interconnected voids 377G, transitions sharply again to a maximum local volume fraction of interconnected voids 380G, transitions sharply again to a minimum local volume fraction of interconnected voids 378G, and finally transitions sharply yet again to the second local volume fraction of interconnected voids 375G. In some cases, each of the local volume fraction of interconnected voids can have transitions that are not step-wise (not shown, but similar to the monotonic variation shown in FIG. 1B).

Gradient optical film 300G can be prepared using a variety of techniques, as described elsewhere. In one particular embodiment, gradient optical film 300G can be prepared, for example, by a multilayer coating technique, where a different photoinitiator concentration can be used in strata corresponding to minimum local void volume fraction (377G, 378G) than in strata corresponding to maximum local void volume fraction 390G. In one particular embodiment, gradient optical film 300G can be prepared, for example, by a multilayer coating technique, where the strata include different ratios of polymeric binder to particles.

Figure 2:
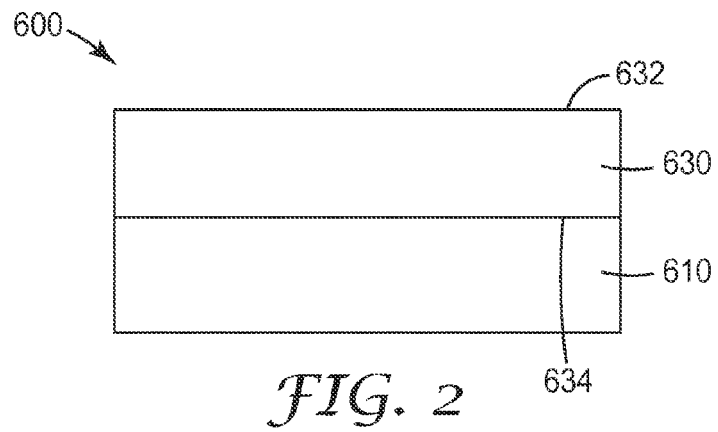
FIG. 2 is a schematic side-view of an optical construction.

FIG. 2 is a schematic side-view of an optical construction 600 that includes a gradient optical film 630 disposed on a substrate 610. In some cases, substrate 610 is a release liner that provides a transferable gradient optical film 630, meaning that, for example, the exposed top major surface 632 of the gradient optical film 630 may be placed in contact with a substrate or surface and the release liner may thereafter be stripped away from the gradient optical film to expose a bottom major surface 634 of the gradient optical film that can, for example, be bonded to another substrate or surface. The release force for releasing low index layer 630 from a release liner 610 is generally less than about 200 g-force/inch, or less than about 150 g-force/inch, or less than about 100 g-force/inch, or less than about 75 g-force/inch, or less than about 50 g-force/inch.

Gradient optical film 630 can be similar to any gradient optical film disclosed herein. For example, gradient optical film 630 can be similar to one of gradient optical films 300A-300G. As another example, gradient optical film 630 can include multiple layers, where each layer is similar to one of gradient optical films 300A-300G. In some cases, one of gradient optical films 300A-300G may be coated directly onto substrate 610. In some cases, one of gradient optical films 300A-300G may be first formed and thereafter transferred onto substrate 610. Substrate 610 can be translucent, transparent, or opaque.

Substrate 610 can be or include any material that may be suitable in an application, such as a dielectric, a semiconductor, or a conductor (such as a metal). For example, substrate 610 can include or be made of glass and polymers such as polyethylene terapthalate (PET), polycarbonates, and acrylics. In some cases, the substrate 610 can include a polarizer such as a reflective polarizer, an absorbing polarizer, a wire-grid polarizer, or a fiber polarizer. In some case, the substrate 610 can include multiple layers, such as a multilayer optical film including, for example, multilayer reflecting films and multilayer polarizing films. In some cases, the substrate 610 can include a structured surface, such as a surface having a plurality of microstructures. In some cases, the substrate 610 can include further coatings on a major surface such as, for example, a primer coating.

As used herein, a fiber polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, the entireties of which are incorporated herein by reference.

In some cases, the substrate 610 can include a partial reflector. A partial reflector is an optical element or a collection of optical elements which reflect at least 30% of incident light while transmitting the remainder, minus absorption losses. Suitable partial reflectors include, for example, foams, polarizing and non-polarizing multilayer optical films, microreplictated structures (e.g. BEF), polarized and non-polarized blends, wire grid polarizers, partially transmissive metals such as silver or nickel, metal/dielectric stacks such as silver and indium tin oxide, and asymmetric optical films. Asymmetric optical films are described, for example, in U.S. Pat. No. 6,924,014 (Ouderkirk et al.) and also in PCT Publication WO2008/144636. Also useful as partial reflectors are perforated partial reflectors or mirrors, such as, for example, perforating ESR (available from 3M Company).

In one particular embodiment, substrate 610 can be a reflective polarizer. A reflective polarizer layer substantially reflects light that has a first polarization state and substantially transmits light that has a second polarization state, where the two polarization states are mutually orthogonal. For example, the average reflectance of a reflective polarizer in the visible for the polarization state that is substantially reflected by the reflective polarizer is at least about 50%, or at least about 60%, or at least about 70%, or at least about 80%, or at least about 90%, or at least about 95%. As another example, the average transmittance of a reflective polarizer in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, the reflective polarizer substantially reflects light having a first linear polarization state (for example, along the x-direction) and substantially transmits light having a second linear polarization state (for example, along the z-direction).

Any suitable type of reflective polarizer may be used such as, for example, a multilayer optical film (MOF) reflective polarizer such as Vikuiti™ Dual Brightness Enhancement Film (DBEF), a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, the reflective polarizer layer can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through the reflective polarizer and an incident light in the unmatched polarization state is substantially reflected by reflective polarizer. In some cases, an MOF reflective polarizer can include a stack of inorganic dielectric layers.

As another example, the reflective polarizer can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, the reflective polarizer can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, the reflective polarizer can be a multilayer optical film that reflects or transmits light by optical interference, such as those described in Provisional U.S. Patent Application No. 61/116,132, filed Nov. 19, 2008; Provisional U.S. Patent Application No. 61/116,291, filed Nov. 19, 2008; Provisional U.S. Patent Application No. 61/116,294, filed Nov. 19, 2008; Provisional U.S. Patent Application No. 61/116,295, filed Nov. 19, 2008; Provisional U.S. Patent Application No. 61/116,295, filed Nov. 19, 2008; and International Patent Application No. PCT/US 2008/060311, filed May 19, 2008, claiming priority from Provisional U.S. Patent Application No. 60/939,085, filed May 20, 2007; all incorporated herein by reference in their entirety.

In one particular embodiment, substrate 610 can be a microstructured surface, such as a prismatic light directing film. For example, gradient optical film 630 can be coated on the prism side of a light redirecting film such as Vikuiti™ Brightness Enhancing Film (BEF), available from 3M Company. The BEF includes a plurality of linear prisms with, for example, a 24 micron pitch and a prism peak or apex angle of about 90 degrees. The gradient optical film 630 can be coated on the microstructured surface as a conformal coating, a planarized coating, or pattern coated, as known to those of skill in the art.

Substantial portions of each two neighboring major surfaces in optical construction 600 are in physical contact with each other along the bottom major surface 634 of gradient optical film 630. For example, at least 50%, or at least 60%, or at least 70%, or at least 80%, or at least 90%, or at least 95% of the two neighboring major surfaces are in physical contact with each other. For example, in some cases, gradient optical film 630 is coated directly on substrate 610.

Figure 3:
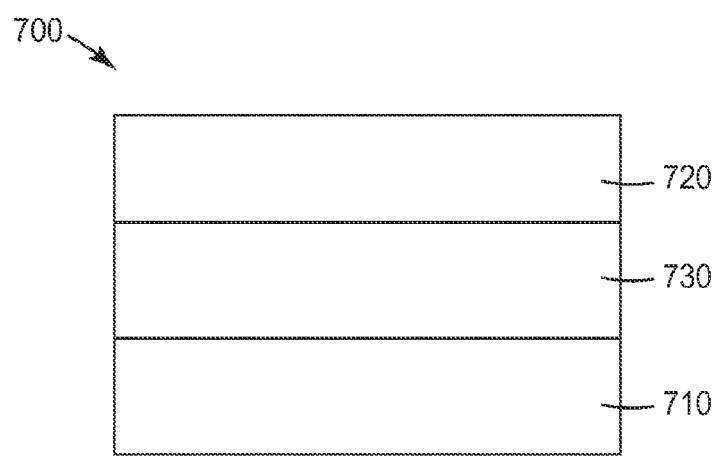
FIG. 3 is a schematic side-view of an optical construction.

FIG. 3 is a schematic side-view of an optical construction 700 that includes a gradient optical film 730 disposed on a substrate 710, and an optical adhesive layer 720 disposed on gradient optical film 730. Substrate 710 can be any of the substrates described elsewhere, including, for example, a substrate such as substrate 610 described with reference to FIG. 2. In some cases the optical adhesive layer 720 can act as a sealer to inhibit infiltration of voids of gradient optical film 730. In some cases, it may be desirable to have adhesive layer 720 and gradient optical film 730 on opposite sides of the substrate 710. In other cases, it may be desirable to have gradient optical film 730 on both sides of substrate 710.

Optical adhesive layer 720 can be any optical adhesive that may be desirable and/or available in an application. Optical adhesive layer 720 is of sufficient optical quality and light stability such that, for example, the adhesive layer does not yellow with time or upon exposure to weather so as to degrade the optical performance of the adhesive and the gradient optical film. In some cases, optical adhesive layer 720 can be a substantially clear optical adhesive meaning that the adhesive layer has a high specular transmittance and a low diffuse transmittance. For example, in such cases, the specular transmittance of optical adhesive layer 720 is not less than about 70%, or not less than about 80%, or not less than about 90%, or not less than about 95%.

In some cases, optical adhesive layer 720 is substantially optically diffusive, meaning that the adhesive layer has a high diffuse transmittance and a low specular transmittance, and the optical adhesive layer 720 can have a white appearance. For example, in such cases, the optical haze of an optically diffusive adhesive layer 720 is not less than about 30%, or not less than about 30%, or not less than about 50%, or not less than about 60%, or not less than about 70%, or not less than about 80%, or not less than about 90%, or not less than about 95%. In some case, the diffuse reflectance of the diffusive adhesive layer is not less than about 20%, or not less than about 30%, or not less than about 40%, or not less than about 50%, or not less than about 60%. In such cases, the adhesive layer can be optically diffusive by including a plurality of particles dispersed in an optical adhesive where the particles and the optical adhesive have different indices of refraction. The mismatch between the two indices of refraction can result in light scattering.

Exemplary optical adhesives include pressure sensitive adhesives (PSAs), heat-sensitive adhesives, solvent-volatile adhesives, repositionable adhesives or reworkable adhesives, and UV-curable adhesives such as UV-curable optical adhesives available from Norland Products, Inc.

Exemplary PSAs include those based on natural rubbers, synthetic rubbers, styrene block copolymers, (meth)acrylic block copolymers, polyvinyl ethers, polyolefins, and poly (meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

Gradient optical film 730 can be similar to any gradient optical film disclosed herein. For example, gradient optical film 730 can be similar to one of gradient optical films 300A-300G. As another example, gradient optical film 730 can include multiple layers, where each layer is similar to one of gradient optical films 300A-300G.

In one particular embodiment, an optional optical diffuser (not shown) can be disposed on the optical adhesive 720, forming a stack of optical diffuser/optical adhesive/gradient optical film/substrate. The optional optical diffuser can include any optical diffuser that may be desirable and/or available in an application. For example, the optical diffuser can be or include a surface diffuser, a volume diffuser, or a combination thereof. For example, the optional optical diffuser can include a plurality of particles having a first index of refraction $n_1$ dispersed in a binder or host medium having a different index of refraction $n_2$, where the difference between the two indices of refraction is at least about 0.01, or at least about 0.02, or at least about 0.03, or at least about 0.04, or at least about 0.05.

Figure 4:
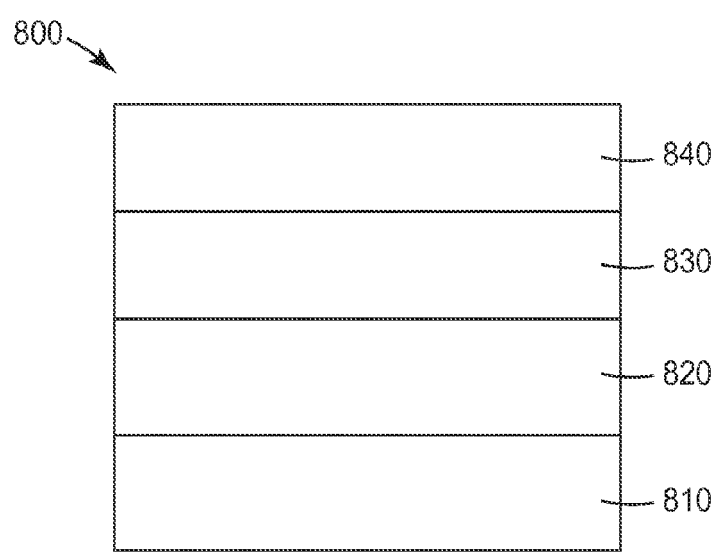
FIG. 4 is a schematic side-view of an optical construction.

FIG. 4 is a schematic side-view of an optical construction 800 that includes a first optical adhesive layer 820 disposed on a substrate 810, a gradient optical film 830 disposed on first optical adhesive layer 820, and an optional second optical adhesive layer 840 disposed on gradient optical film 830. Substrate 810 can be any of the substrates described elsewhere, including, for example, a substrate such as substrate 610 described with reference to FIG. 2. Optical adhesive layers 820 and 840 can be similar to optical adhesive layer 720. In some cases, optical adhesive layers 820 and 840 have the same index of refraction. In some cases, the two adhesive layers can have different indices of refraction.

Gradient optical film 830 can be similar to any gradient optical film disclosed herein. For example, gradient optical film 830 can be similar to one of gradient optical films 300A-300G. As another example, gradient optical film 830 can include multiple layers, where each layer is similar to one of gradient optical films 300A-300G.

Figure 9:
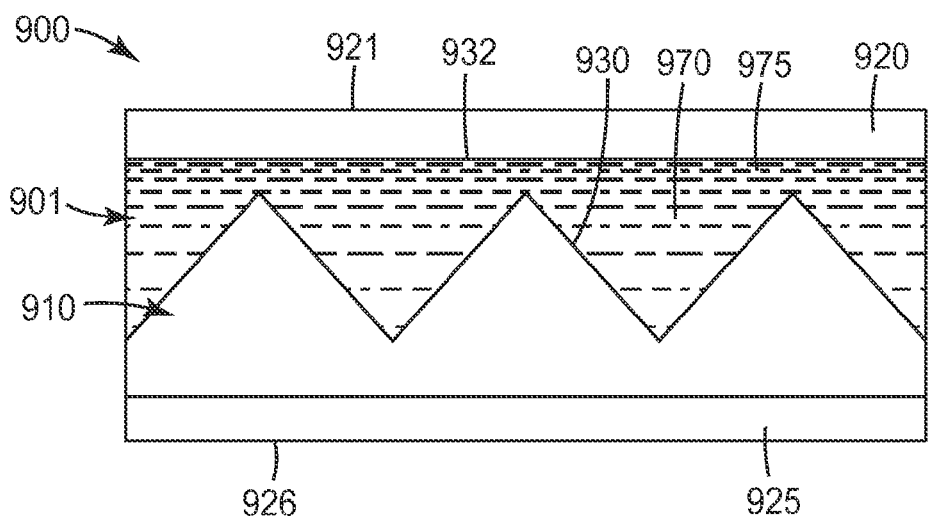
FIG. 9 is a schematic side-view of an optical construction.

FIG. 9 is a schematic side-view of an optical construction 900 according to one particular embodiment of the disclosure. In FIG. 9, a gradient optical film 901 is coated on a microstructured substrate 910. The microstructured substrate 910 can be a prismatic light directing film such as a Vikuiti™ Brightness Enhancing Film (BEF), available from 3M Company. The BEF includes a plurality of linear prisms with, for example, a 24 micron pitch and a prism peak or apex angle of about 90 degrees. The gradient optical film 901 can be coated on the microstructured surface 930 of the microstructured substrate 910 to planarize the surface structure, as shown in FIG. 9.

The gradient optical film 901 includes a low-index (that is, high local volume fraction of interconnected voids) region 970 adjacent the microstructured surface 930, and a higher-index (that is, low local volume fraction of interconnected voids) region 975 adjacent an opposite planar surface 932. An optical adhesive layer 920 having a first free surface 921 can be disposed on the planar surface 932 adjacent the higher-index region 975, as described elsewhere. In some cases, the optical construction 900 can be affixed to other optical structures (not shown), for example, a display panel or a display panel light guide, by the first free surface 921. In some cases, the microstructured substrate 910 can include an optional optical film 925, such as a polymeric film or an optical adhesive layer, that can be affixed to other optical structures (not shown) adjacent a second free surface 926.

Figure 5A:
FIG. 5A is a cross-sectional micrograph of a gradient optical film.
Figure 5B:
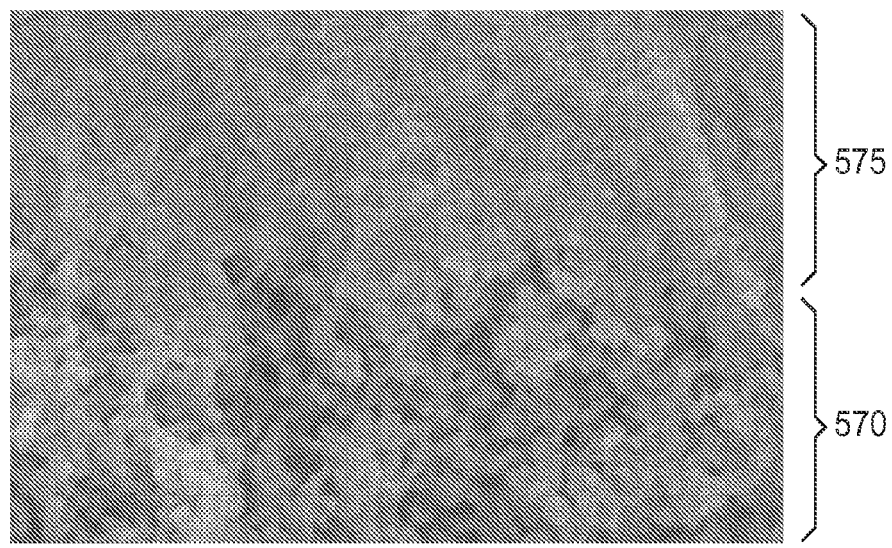
FIG. 5B is a higher magnification of the micrograph in FIG. 5A.

FIG. 5A is a cross-sectional micrograph of a gradient optical film 500 coated on a substrate 510, according to one aspect of the disclosure. The gradient optical film 500 includes a first major surface 530 adjacent to the substrate 510, and a first local volume fraction of interconnected voids 570 proximate the first major surface 530. The gradient optical film further includes a second major surface 532 that is a "free" surface, (that is, adjacent the curing environment) and a densified second local volume fraction of interconnected voids 575 proximate the second major surface 532. The gradient optical film 500 was prepared in an oxygen rich environment (3578 ppm oxygen, according to Sample 1a in Example 1, below) which inhibited the polymerization proximate the second major surface 532. FIG. 5B is a higher magnification of the micrograph in FIG. 5A, and more clearly shows that the first local volume fraction of interconnected voids 570 is greater than the densified second volume fraction of interconnected voids 575, which has become densified due to the inhibited polymerization.

Figure 6A:
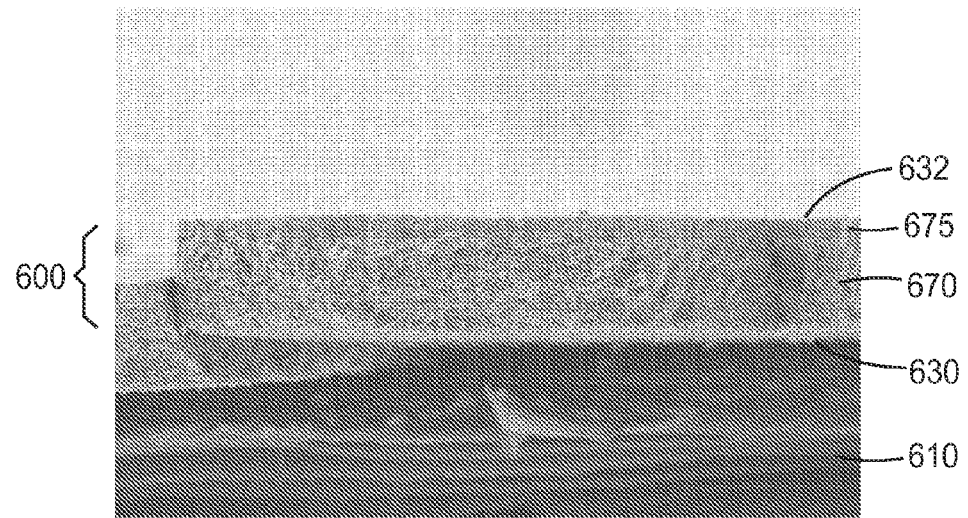
FIG. 6A is a cross-sectional micrograph of a gradient optical film.
Figure 6B:
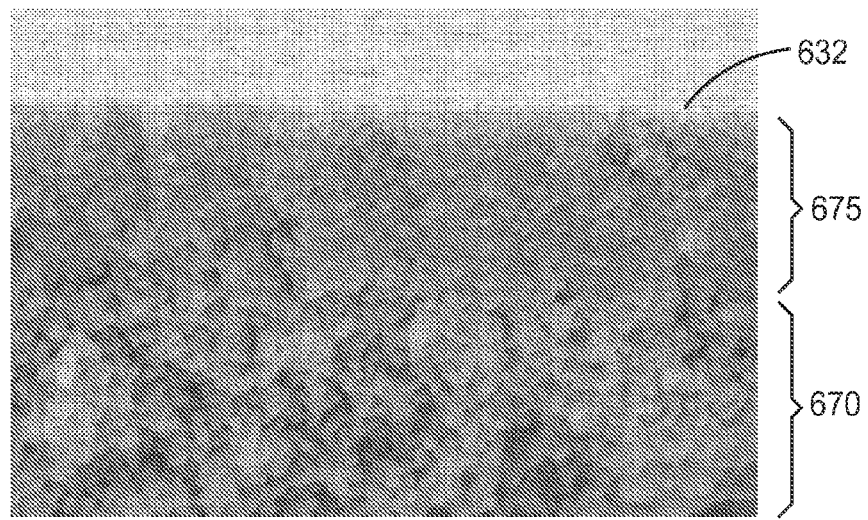
FIG. 6B is a higher magnification of the micrograph in FIG. 5A.

FIG. 6A is a cross-sectional micrograph of a gradient optical film 600 coated on a substrate 610, according to one aspect of the disclosure. The gradient optical film 600 includes a first major surface 630 adjacent to the substrate 610, and a first local volume fraction of interconnected voids 670 proximate the first major surface 630. The gradient optical film further includes a second major surface 632 that is a "free" surface, (that is, adjacent the curing environment) and a densified second local volume fraction of interconnected voids 675 proximate the second major surface 632. The gradient optical film 600 was prepared in lower oxygen rich environment (1707 ppm oxygen, according to Sample 3a in Example 1, below), than the gradient optical film 500 of FIGS. 5A-5B. The oxygen rich environment inhibited the polymerization proximate the second major surface 632. FIG. 6B is a higher magnification of the micrograph in FIG. 6A, and more clearly shows that the first local volume fraction of interconnected voids 670 is greater than the densified second volume fraction of interconnected voids 675, which has become densified due to the inhibited polymerization. Comparison of the relative thickness of the densified second volume fraction of interconnected voids 575 and 675 shows the increase in the thickness of the densified region with an increase in the oxygen concentration in the curing environment.

Some of the advantages of the disclosed films, layers, constructions, and systems are further illustrated by the following examples. The particular materials, amounts and dimensions recited in this example, as well as other conditions and details, should not be construed to unduly limit the present invention.

In the examples, the index of refraction was measured using a Metricon Model 2010 Prism Coupler (available from Metricon Corp., Pennington, N.J.). Optical transmittance, clarity, and haze were measured using a Haze-Gard Plus haze meter (available from BYK-Gardner, Silver Springs, Md.).

EXAMPLES

The following list of materials and their source is referred to throughout the Examples.

| | |
|---|---|
| Nalco 2327—colloidal silica dispersion | Nalco Co. Naperville IL |
| Nalco 2329—colloidal silica dispersion | Nalco Co. Naperville IL |
| IPA-ST-UP organosilica elongated particles | Nissan Chemical Inc., Houston, TX |
| 3-(trimethoxysilyl)propyl methacrylate (acrylate silane) | Aldrich Chemical, Milwaukee WI |
| Silquest ® A-174 silane | GE Advanced Materials, Wilton CT |
| Silquest ® A-1230 silane | GE Advanced Materials, Wilton CT |
| 1-methoxy-2-propanol - solvent | Aldrich Chemical, Milwaukee WI |
| Photomer 6210 aliphatic urethane acrylate | Cognis, Cincinnati OH |
| SR444 Pentaerythritol triacrylate | Sartomer Company, Exton PA |
| SR833S tricyclodecane dimethanol diacrylate | Sartomer Company, Exton PA |
| SR9003 propoxylated neopentyl glycol diacrylate | Sartomer Company, Exton PA |
| Darocur 4265—photoinitiator | Ciba Specialty Chemical, High Point NC |
| Irgacure 184—photoinitiator | Ciba Specialties Chemical, Tarrytown NY |
| Irgacure 819—photoinitiator | Ciba Specialties Chemical, Tarrytown NY |
| IPA - isopropyl alcohol (solvent) | Aldrich Chemical, Milwaukee WI |
| MEK—methyl ethyl ketone (solvent) | Aldrich Chemical, Milwaukee WI |
| Vikuiti ™ Dual Brightness Enhancing Film (DBEF, DBEF-Q, TOP-Q) | 3M Company, St. Paul, MN |
| KSR3 polystyrene beads | Soken Chemical and Engineering Co., Tokyo |
| CN2302 polyester acrylate | Sartomer Company, Exton PA |
| TEGO Rad 2250 | Evonic Industries Hopewell, VA |

Example A

Photoinitiator Priming on DBEF to Generate Gradient

A photoinitiator was coated on a substrate to generate the change in density from the substrate interface to an air interface. The photoinitiator coating solution was prepared by mixing 0.3% by weight of Irgacure 819 in MEK. This photoinitiator solution was coated onto a DBEF film using a 43.2 cm (17 inch) wide slot-type coating die. The solution was coated at a rate of 127 g/min and a line speed of 30.5 m/min (100 feet/min). The coating was then dried in an oven at 150° F. (66° C.). This resulted in a photoinitiator primed substrate.

A coating solution "A" was made. First, 360 g of Nalco 2327 colloidal silica particles (40% wt solid and an average particle diameter of about 20 nanometers) and 300 g of 1-methoxy-2-propanol were mixed together under rapid stirring in a 2-liter three-neck flask that was equipped with a condenser and a thermometer. Next, 22.15 g of Silquest A-174 silane was added, and the mixture was stirred for 10 minutes. An additional 400 g of 1-methoxy-2-propanol was then added, and the mixture was heated at 85° C. for 6 hours using a heating mantle. The resulting solution was allowed to cool down to room temperature, and most of water and 1-methoxy-2-propanol solvents (about 700 g) were removed using a rotary evaporator under a 60° C. water-bath. The resulting solution was a clear A-174 modified silica solution having 44% wt A-174 modified 20 nm silica, dispersed in 1-methoxy-2-propanol.

The coating solution "A" was composed of 18.0 wt % of the clear A-174 modified silica solution (having 44% wt A-174 modified 20 nm silica dispersed in 1-methoxy-2-propanol), 23.9 wt % 1-methoxy-2-propanol, 46.1 wt % IPA, 12.0 wt % SR444. Irgacure 819 was added to coating solution "A" at a rate 0.15 parts per hundred (pph). Coating solution A was pumped (using a pressure pot) at a rate of 15.2 g/min into a 43.2 cm (17 inch) wide slot-type coating die. The slot coating die uniformly distributed a 43.2 cm wide coating onto the photoinitiator primed substrate at a speed of 1.52 m/min (10 ft/min)

Next, the coating was polymerized by passing the coated substrate through a UV-LED cure chamber that included a quartz window to allow passage of UV radiation. The UV-LED cure chamber included a rectangular array of 160 UV-LEDs, 4 down-web by 40 cross-web (approximately covering a 42.5 cm×4.5 cm area). The LEDs (available from Nichia Inc., Tokyo Japan) operated at a nominal wavelength of 385 nm and were run at 8 Amps, resulting in a UV-A dose of 0.052 joules per square cm. The fan-cooled UV-LED array was powered by a Lambda GENH 60-12.5-U power supply (available from TDK-Lambda, Neptune N.J.). The UV-LEDs were positioned above the quartz window of the cure chamber at a distance of approximately 2.5 cm from the substrate. The UV-LED cure chamber was supplied with a flow of nitrogen at a flow rate of 141.6 liters/min (5 cubic feet per minute). Air was introduced into the nitrogen supply to control the total oxygen level in the UV-LED chamber. The oxygen level in the UV-LED cure chamber was varied by changing the airflow rate, and the oxygen level was monitored using a Series 3000 oxygen analyzer (available from Alpha Omega Instruments, Cumberland R.I.).

After being polymerized by the UV-LEDs, the solvent in the cured coating was removed by transporting the coated substrate to a drying oven at 150° F. (66° C.) for 2 minutes at a web speed of 10 ft/min. Next, the dried coating was post-cured using a Fusion System Model I600 configured with a D-bulb (available from Fusion UV Systems, Gaithersburg Md.). The UV Fusion chamber was supplied with a flow of nitrogen that resulted in an oxygen concentration of approximately 50 ppm in the chamber.

Example B

Volume Diffuser Overcoat on Gradient Optical Film

A volume diffuser coating solution 'B' was made by mixing 27.4 g of 1-methoxy-2-propanol, 27.2 g of methanol, 29.6 g of KSR3 polystyrene beads, 8.1 g of Photomer 6210, 3.6 g of SR833S, 4.2 g of SR9003, and 0.4 g of Darocur 4265.

Volume diffuser coating solution 'B' was coated on substrates using a notched bar coating apparatus at a gap thickness of 127 microns. The coating was dried at 150° F. (66° C.) for 2 min, then cured using a Fusion System Model I600 (Fusion UV Systems, Gaithersburg Md.) at 13.7 m/min. The Model I600 was configured with a D-bulb and operated at 100% power. The UV Fusion chamber was supplied with a flow of nitrogen that resulted in an oxygen concentration of approximately 50 ppm in the cure chamber.

Example 1

Refractive Index and Densified Layer Change in Gradient Optical Film

Coating solution A was coated on photoinitiator primed DBEF reflective polarizer film according to Example A, to produce a series of coated films. The curing conditions for each coated film were the same, but with variable air flow rates and oxygen levels.

Transmission and haze were measured using a BYK-Gardner Haze-Gard. The refractive index (RI) of the coating was measured using a Model 2010 Prism Coupler (available from Metricon Corporation, Pennington N.J.). The Model 2010 Metricon was configured with a HeNe laser operating at a wavelength of 632.8 nm and an optical prism (code 6567.9). The measurements were made in both the TE and TM modes. To determine the film side refractive index of the coating, the sample was loaded such that the substrate was in intimate contact with the prism coupler. To determine the air side refractive index of the coating, the sample was loaded such that the coating was in intimate contact with the prism coupler. Results of the measurements on each of the coatings are summarized in Table 1.

TABLE 1

| Sample | Air Flow (cc/min) | O2 (ppm) | Trans (%) | Haze (%) | RI (air side) | RI (film side) | ΔRI |
|---|---|---|---|---|---|---|---|
| 1a | 2000 | 3578 | 48.1 | 8.4 | 1.47 | 1.32 | 0.15 |
| 2a | 3000 | 5640 | 48.7 | 0.8 | 1.49 | 1.49 | 0.00 |
| 3a | 1000 | 1707 | 47.8 | 6.4 | 1.44 | 1.27 | 0.17 |

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope.

Figure 7A:
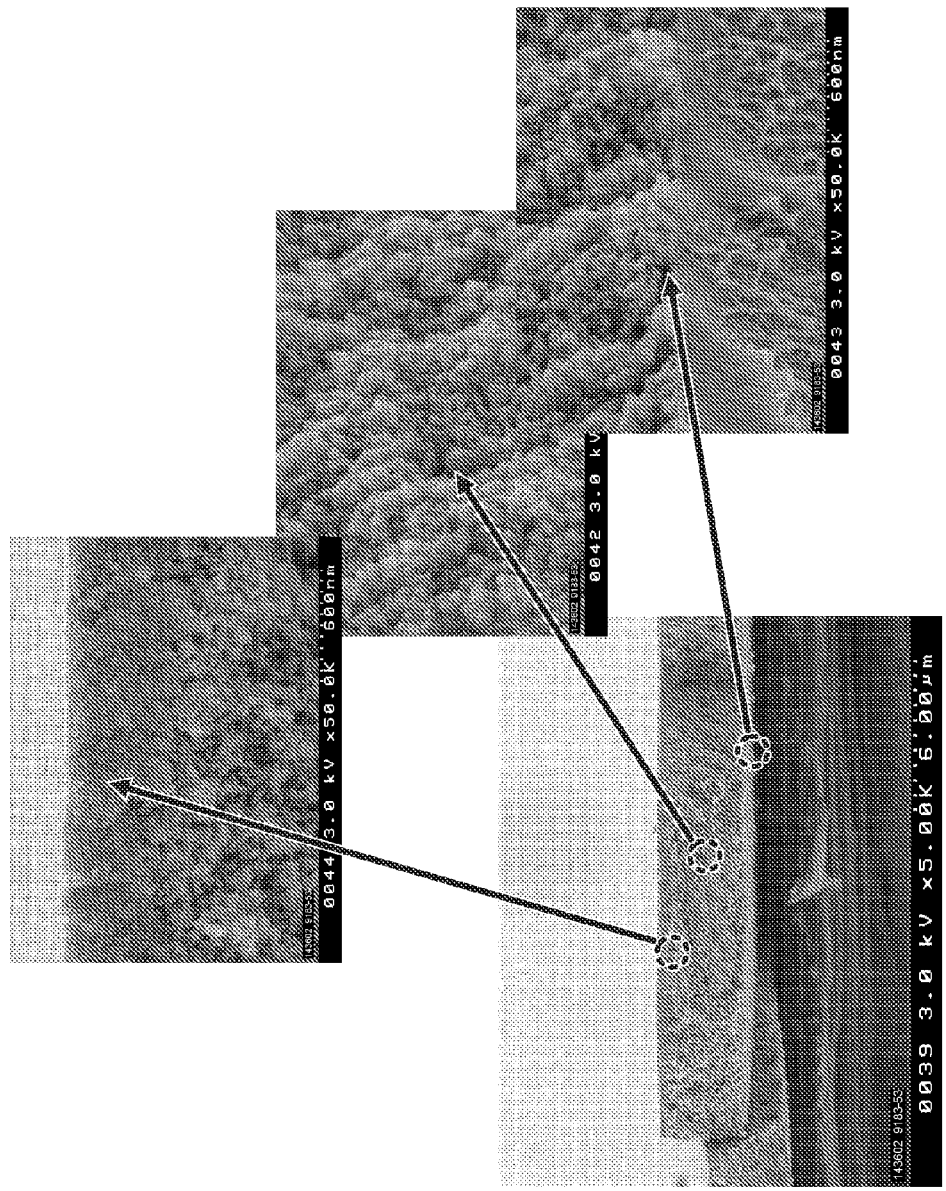
FIGS. 7A-7C are cross-sectional micrographs of gradient optical films.
Figure 7B:
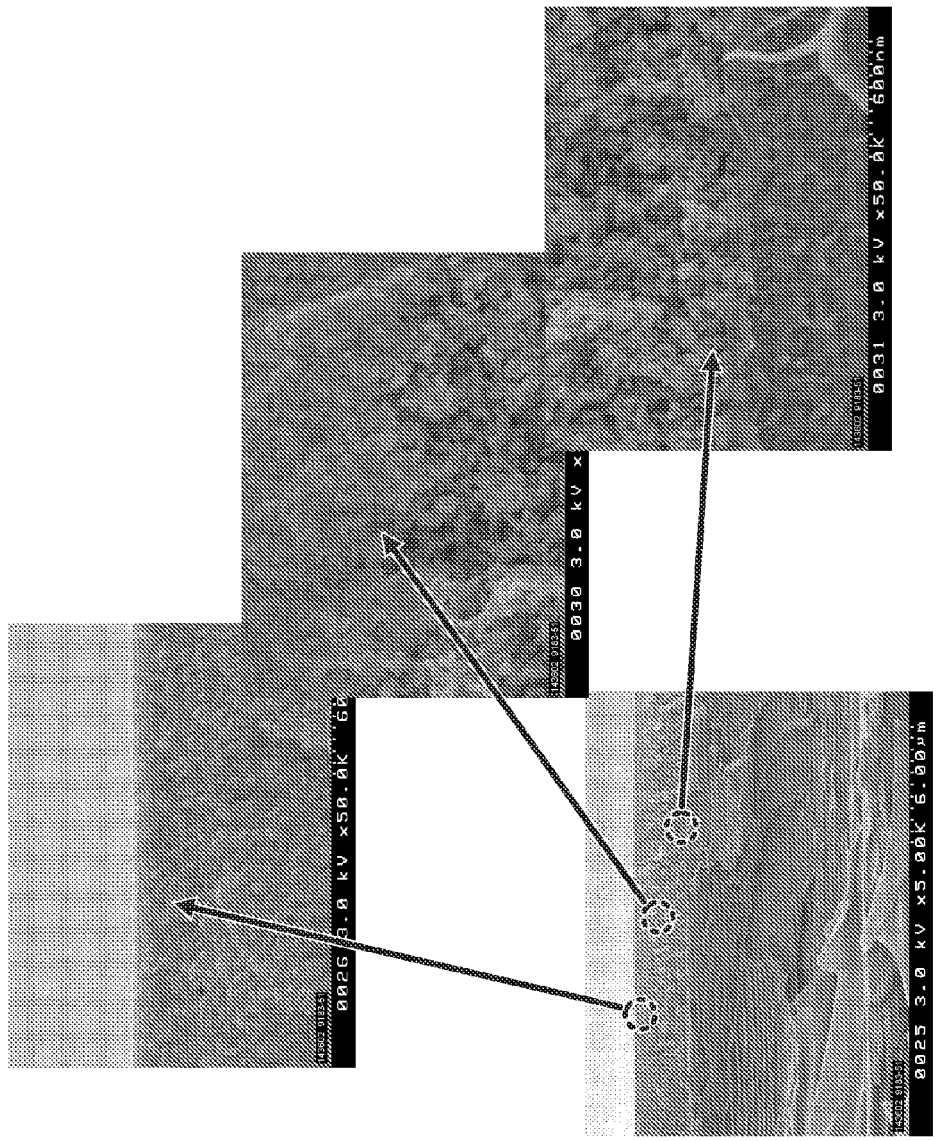
Figure 7C:
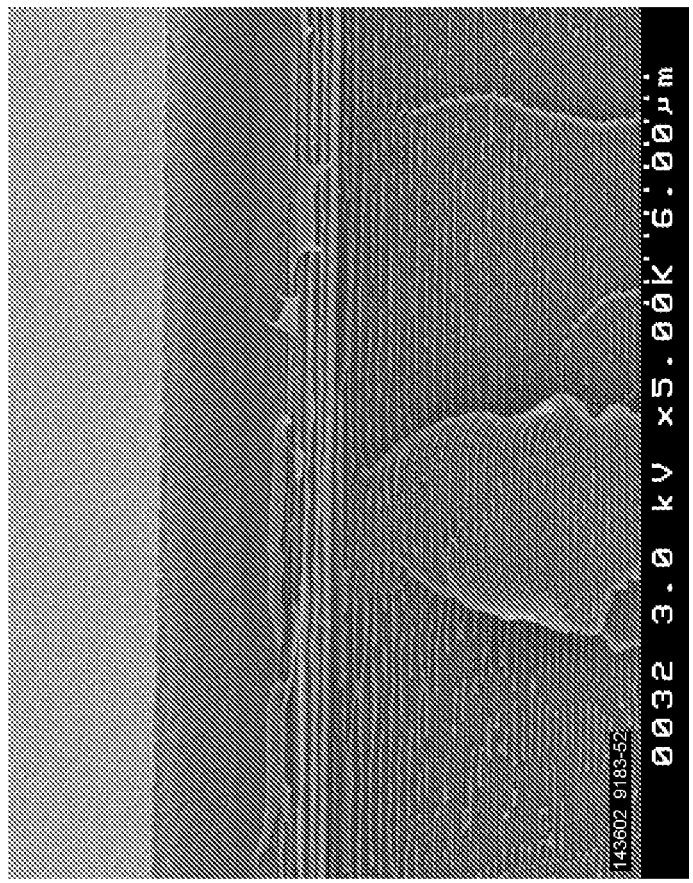

FIGS. 7A-7C show an SEM of samples from Example 1, in order of increasing oxygen level. FIG. 7A shows sample 3a, which was cured at an oxygen level of 1000 ppm. FIG. 7B shows sample 1a, which was cured at 2000 ppm. FIG. 7C shows sample 2a, which was cured at 3000 ppm. The air interface is less porous than the layer near the substrate interface. The thickness of the densified layer is dependent on the oxygen concentration, with higher oxygen levels producing thicker densified layers.

Example 2

Overcoated Control Optical Film without Gradient

A gradient optical film was overcoated with a solution to determine if the solution would infiltrate the pores. Coating solution 'B' was coated onto a gradient optical film, sample 9146-1, which was produced by the processes described in co-pending application titled "OPTICAL FILM", 61/169, 466. A coating solution was made by mixing Irgacure 819 (0.15 pph) and Irgacure 184 (0.45 pph) into coating solution "A." The solution was coated on a TOPQ reflective polarizer at a line speed of 9.14 m/min. Solution was delivered using a slot-type die at a rate of 43 g/min and at a coating width of 20.3 cm (8 inches). The coating was polymerized using an array of 395 nm UV-LEDs (Cree, Inc., Durham N.C.). The UV-LEDs operated at 2.25 Amps and delivered a UV-V dosage of 0.03 joules per square cm. The array measured 16 LEDs downweb by 22 crossweb. Nitrogen was introduced to the cure chamber using a slot-type manifold to maintain an inert atmosphere. The oxygen concentration in the chamber was measured using a Series 3000 Alpha Omega Analyzer; it was maintained below 100 ppm. After curing, the coating was dried at 150° F. (66C), then post-cured at 70° F. (21C) using a Fusion System Model I600 (Fusion UV Systems, Gaithersburg Md.). The Model I600 was configured with a D-bulb and operated at 100% power. The UV Fusion chamber was supplied with a flow of nitrogen that resulted in an oxygen concentration of approximately 50 ppm in the post-cure chamber. The subsequent optical film was characterized as described elsewhere, and had a refractive index on the air side of RI=1.23, and a refractive index on the film side of RI=1.23, resulting in a ΔRI=0. Coating solution 'B' was then coated onto the optical film, sample 9146-1, using the process described in Example B. The product of the described process, sample 9146-1 OC, was a two pass coating on a TOP-Q reflective polarizer. A Model 2010 Metricon was used to measure the change in the film side refractive index of the first coating layer before (RI=1.22) and after (RI=1.49) application of the second coating layer. The film side refractive index increased dramatically after coating, indicating that the pores within the optical film were no longer filled with air.

Example 3

Overcoated Gradient Optical Film

A gradient optical film, sample 9211-30, was overcoated with a solution to determine if the solution would infiltrate the pores. Irgacure 819 was added to coating solution A at a loading of 0.06 pph. Coating solution 'A' was then applied to a 2 mil PET film using a 20.3 cm (8 inch) slot-type die at a line speed of 6.1 m/min and a flow rate of 40 g/min. The coating was polymerized using an array of 395 nm UV-LEDs (Cree, Inc., Durham N.C.). The UV-LEDs operated at 5 Amps and delivered a UV-V dosage of 0.1 joules per square cm. The array measured 16 LEDs downweb by 22 LEDs crossweb. Nitrogen was introduced to the cure chamber using a slot-type manifold at a flow rate of 118 L/min Air was mixed in-line with the nitrogen supply to maintain an oxygen concentration of 5012 ppm in the UV-LED cure chamber. The oxygen concentration in the chamber was measured using a Series 3000 Alpha Omega Analyzer. After curing, the coating was dried at 150° F. (66 C), then post-cured at 70° F. (21 C) using a Fusion System Model I600 (Fusion UV Systems, Gaithersburg Md.). The Model I600 was configured with a D-bulb and operated at 100% power. The UV Fusion chamber was supplied with a flow of nitrogen that resulted in an oxygen concentration of approximately 50 ppm in the post-cure chamber. The subsequent gradient optical film, sample 9211-30, was characterized as described elsewhere, and had a refractive index on the air side of RI=1.47, and a refractive index on the film side of RI=1.26, resulting in a ΔRI=0.21.

Coating solution 'B' was then applied to gradient optical film as described in Example B. A Model 2010 Metricon was used to measure the change in the film side refractive index of the first coating layer before (RI=1.26) and after (RI=1.26) application of the second coating layer. Upon application of the second coating, there is negligible change in the film side refractive index, indicating that the first coating is sealed to penetration.

Example 4

Adhesive Penetration into Optical Film

The coated side of optical film sample 9146-1 from Example 2 was laminated to glass using an optically clear pressure sensitive adhesive (8171, available from 3M Company). The sample was thermally aged at 85° C. for a period of 150 h. A Model 2010 Metricon was used to measure the change in the film side refractive index of the coated layer before (RI=1.23) and after (RI=1.33) thermally ageing against the pressure sensitive adhesive layer. The film side refractive index increased after ageing, indicating that some of the pores within the optical film were no longer filled with air.

Example 5

Adhesive Penetration into Gradient Optical Film

The coated side of optical film sample 9211-30 from Example 3 was laminated to glass using an optically clear pressure sensitive adhesive (8171, available from 3M Company). The sample was thermally aged at 85° C. for a period of 150 h. A Model 2010 Metricon was used to measure the change in the film side refractive index of the coated layer before (RI=1.26) and after (RI=1.26) thermally ageing against the pressure sensitive adhesive layer. After thermal ageing there is negligible change in the film side refractive index, indicating that the optical film is sealed to penetration.

Example C

Improved Durability by Monomer Selection

A coating solution "C" was made. First, 360 g of Nalco 2327 colloidal silica particles (40% wt solid and an average particle diameter of about 20 nanometers) and 300 g of 1-methoxy-2-propanol were mixed together under rapid stirring in a 2-liter three-neck flask that was equipped with a condenser and a thermometer. Next, 22.15 g of Silquest A-174 silane was added, and the mixture was stirred for 10 minutes. An additional 400 g of 1-methoxy-2-propanol was then added, and the mixture was heated at 85° C. for 6 hours using a heating mantle. The resulting solution was allowed to cool down to room temperature, and most of water and 1-methoxy-2-propanol solvents (about 700 g) were removed using a rotary evaporator under a 60° C. water-bath. The resulting solution was a clear A-174 modified silica solution having 44% wt A-174 modified 20 nm silica, dispersed in 1-methoxy-2-propanol.

Next 120 g of the A-174 modified silica solution, 17.6 g of CN2302, 35.2 g of SR444, 1.05 g of TEGO Rad 2250, 0.264 g of Irgacure 819, 0.81 g of Irgacure 184, and 156 g of isopropyl alcohol were mixed together by stirring to form a homogenous coating solution C.

Example D

Medium Haze Coating Solution

A coating solution "D" was made. First, 309 g of Nalco 2327 (40% wt solid) and 300 g of 1-methoxy-2-propanol were mixed together under rapid stirring in a 2-liter three-neck flask that was equipped with a condenser and a thermometer. Next, 9.5 g of Silquest A-174 and 19.0 g of Silquest A-1230 were added, and the resulting mixture was stirred for 10 min. The mixture was heated at 80° C. for 1 hour using a heating mantle. An additional 400 g of 1-mothoxy-2-propanol was added, and the mixture was kept at 80° C. for 16 hours. The resulting solution was allowed to cool down to room temperature, and most of water and 1-methoxy-2-propanol solvents (about 700 grams) were removed using a rotary evaporator under a 60° C. water-bath. The resulting solution was a clear A174/A1230 modified silica solution having 48.7 wt % A174/A1230 modified 20 nm silica dispersed in 1-methoxy-2-propanol.

Next, 63.4 g of the clear A174/A1230 modified silica solution, 30.8 g of SR 444, 0.46 g of g of Irgacure 184, and 98 g of isopropyl alcohol were mixed together by stirring to form a homogenous coating solution D.

Example E

Coating Solution Having 75 Micron Silica Particles

A coating solution "E" was made. 300 g of Nalco 2329 silica particles (40% wt solid with an average particle size of 75 nm) and 300 g of 1-methoxy-2-propanol were mixed together under rapid stirring in a 1-liter flask that was equipped with a condenser and a thermometer. Next, 7.96 g of Silquest A-174 was added, and the resulting mixture was stirred for 10 min. An additional 400 g of 1-methoxy-2-propanol was added, and the resulting mixture was heated at 85° C. for 6 hours using a heating mantle. The resulting solution was allowed to cool down to room temperature, and most of the water and 1-methoxy-2-propanol solvents (about 720 g) were removed using a rotary evaporator under a 60° C. water-bath. The resulting solution was an A-174 modified 75 nm silica solution having 45 wt % A-174 modified 75 nm silica dispersed in 1-methoxy-2-propanol.

Next, 54.6 g of the A-174 modified 75 nm silica solution, 24.6 g of SR444, 70 g of isopropyl alcohol, 0.122 g of Irgacure 819, and 0.368 g of Irgacure 184 were mixed together by stirring to form a homogenous coating solution E.

Example F

Coating Solution Having Elongated Particles

A coating solution "F" was made. In a 2 liter three-neck flask, equipped with a condenser and a thermometer, 960 grams of IPA-ST-UP organosilica elongated particles, 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA, and 22.8 grams of Silquest A-174 silane was added to the flask. The resulting mixture was stirred for 30 minutes.

The mixture was kept at 81° C. for 16 hours. Next, the solution was allowed to cool down to room temperature, and about 950 grams of the solvent in the solution was removed using a rotary evaporator under a 40° C. water-bath, resulting in a clear A-174-modified elongated silica solution having 41.7% wt A-174-modified elongated silica dispersed in 1-methoxy-2-propanol.

Next, 200 grams of the clear A-174-modified elongated silica solution, 83.4 grams of SR 444, 1.6 g of TEGO Rad 2250, 1.25 grams of Irgacure 184, and 233 grams of isopropyl alcohol were mixed together and stirred, resulting in a homogenous coating solution F, having 32.5% wt solids.

Example G

Coating Procedure

A coating procedure "G" was developed. First, a coating solution was syringe-pumped at a rate of 6 cc/min into a 10.2 cm (4-inch) wide slot-type coating die. The slot coating die uniformly distributed a 10.2 cm wide coating onto a substrate moving at 152 cm/min (10 ft/min).

Next, the coating was polymerized by passing the coated substrate through a UV-LED cure chamber that included a quartz window to allow passage of UV radiation. The UV-LED bank included a rectangular array of 160 UV-LEDs, 8 down-web by 20 cross-web (approximately covering a 10.2 cm×20.4 cm area). The LEDs (available from Cree, Inc., Durham N.C.) operated at a nominal wavelength of 385 nm, and were run at 45 Volts at 8 Amps, resulting in a UV-A dose of 0.212 joules per square cm. The fan cooled UV-LED array was powered by a TENMA 72-6910 (42V/10 A) power supply (available from Tenma, Springboro Ohio). The UV-LEDs were positioned above the quartz window of the cure chamber at a distance of approximately 2.5 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber. An additional oxygen flow was supplied to control the total oxygen level in the UV-LED chamber.

After being polymerized by the UV-LEDs, the solvent in the cured coating was removed by transporting the coated substrate to a drying oven at 150° F. (66° C.) for 1 minute at a web speed of 10 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber.

Example 6

Coating on Adhesion Primed PET

Coating solution C was coated on adhesion primed PET films (available from DuPont Teijin Films) according to Example H, with the UV-LEDs at 9 Amps, and variable flow rate and oxygen levels. Optical properties including transmission, haze, clarity, and effective refractive index (RI) were measured as described elsewhere. Results of the measurements on each of the coatings are summarized in Table 2.

TABLE 2

| Sample | Pump Speed (CC/MIN) | N2 (cfh) | Air Flow (cfh) | O2 (ppm) | Trans %. | Haze % | RI (air side) | RI (film side) | ΔRI |
|---|---|---|---|---|---|---|---|---|---|
| 1b | 6 | 100 | 0 | <100 | 88.2 | 14.4 | 1.1716 | 1.1653 | |
| 2b | 6 | 100 | 0.5 | 1000 | 87.9 | 13 | 1.2986 | 1.1892 | 0.109 |
| 3b | 6 | 100 | 1 | 2000 | 87.1 | 14.6 | 1.3386 | 1.1947 | 0.144 |
| 4b | 6 | 100 | 2 | 4000 | 87.5 | 17.7 | 1.4371 | 1.2102 | 0.227 |
| 5b | 6 | 50 | 2 | 6000 | 89.2 | 23.9 | 1.4717 | 1.2705 | 0.201 |
| 9b | 5 | 100 | 2 | 4000 | 89.5 | 16 | 1.4623 | 1.2351 | 0.227 |
| 10b | 7 | 100 | 2 | 4000 | 86.1 | 25.3 | 1.4351 | 1.2058 | 0.229 |
| 11b | 8 | 100 | 2 | 4000 | 85.5 | 26.9 | 1.3829 | 1.1961 | 0.187 |

Figure 8A:
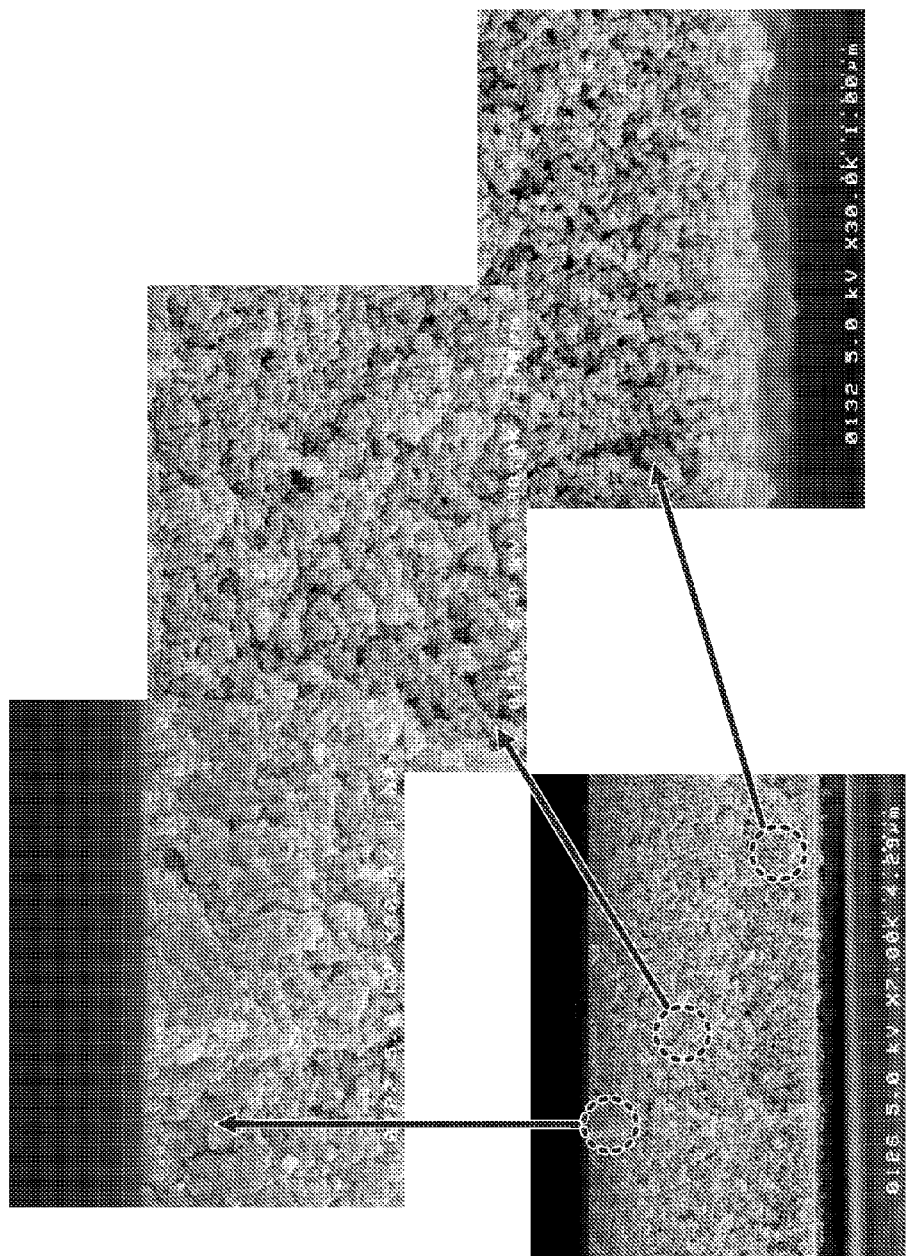
FIGS. 8A-8C are cross-sectional micrographs of gradient optical films.

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope. FIG. 8A shows an SEM of sample 10b from Example 6; sample 10b had the largest ΔRI of the samples prepared in Example 6. Larger ΔRI corresponded to a larger difference in the void volume fraction in the two surfaces.

Example 7

Photoinitiator Primed PET Substrate with Medium Haze Gradient Coating

A photoinitiator (PI) coating solution was prepared by mixing 0.2% by weight of Irgacure 819 with MEK. This PI coating solution was coated onto 2 mil (0.05 mm) PET film, using a pressure pot at 1.75 cc/min through an 8" wide slot die that was shimmed to 4", at a speed of 30 feet/min (75.6 cm/min). The coating was dried in an oven at 150° F. (66° C.), resulting in a PI primed 2 mil (0.05 mm) PET film.

Coating solution D was coated on the PI primed 2 mil (0.05 mm) PET films according to Example H, except the UV-LEDs (available from Cree, Inc., Durham N.C.) operated at a nominal wavelength of 395 nm, and were run at 13 Amps. Optical properties including transmission, haze, clarity, and effective refractive index (RI) were measured as described elsewhere. Results of the measurements on each of the coatings are summarized in Table 3.

Figure 8B:
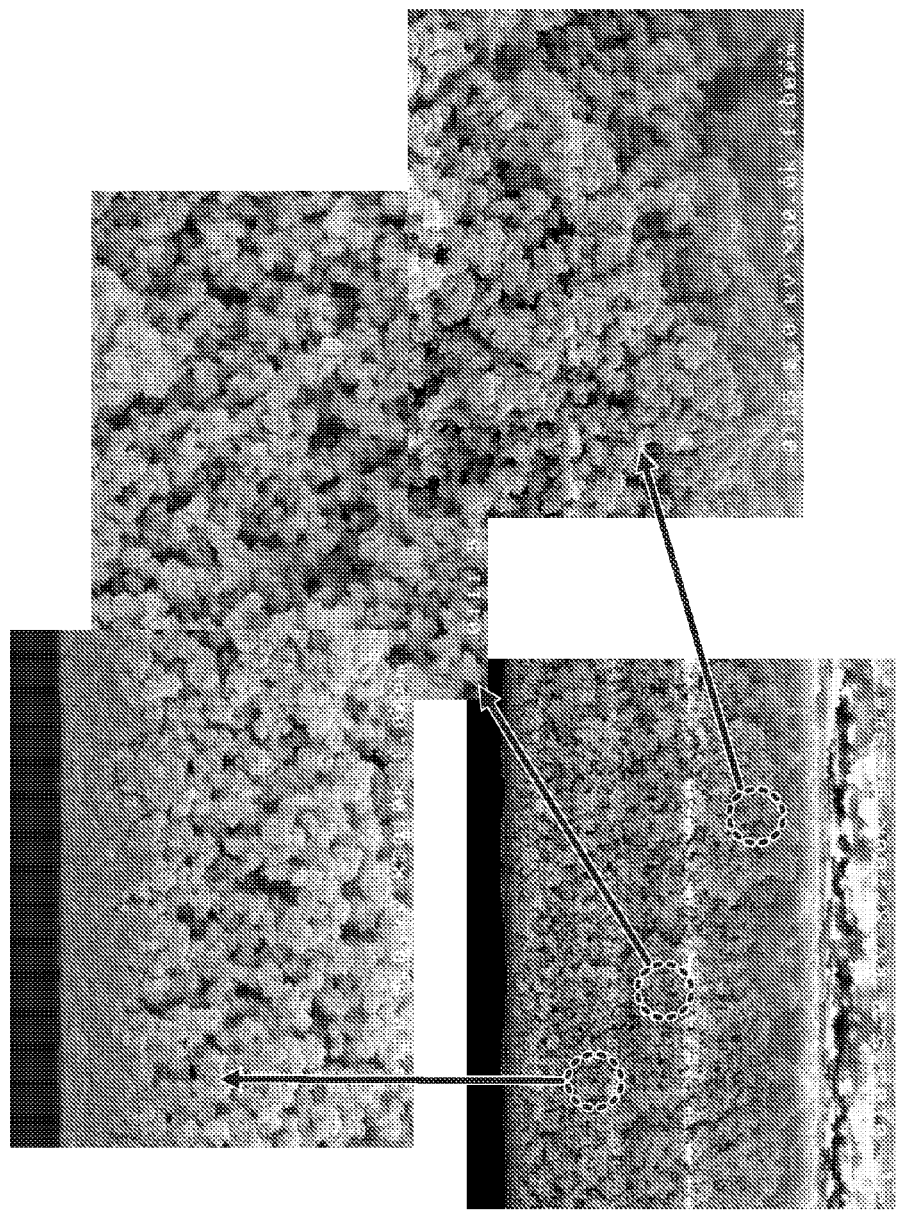

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope. FIG. 8B shows an SEM of sample 30c from Example 7; sample 30c had the largest ΔRI of the samples prepared in Example 7. Larger ΔRI corresponded to a larger difference in the void volume fraction in the two surfaces.

Example 8

PI Primed PET Substrate with 75 Micron Silica Coating Solution

Coating solution E was coated on PI primed 2 mil (0.05 mm) PET films according to Example H, with a 5 cc/min solution flow rate, varied oxygen levels, and the UV-LEDs were run at 9 Amps. Optical properties including transmission, haze, and effective refractive index (RI) were measured as described elsewhere. Results of the measurements on each of the coatings are summarized in Table 4.

TABLE 3

| Sample | N2 (cfh) | Air (cfh) | O2 (ppm) | Trans % | Haze % | Clarity % | RI (air side) | RI film side | ΔRI |
|---|---|---|---|---|---|---|---|---|---|
| 27c | 100 | 0 | <100 | 68 | 59 | 99.5 | 1.1523 | 1.1616 | |
| 28c | 100 | 0.5 | 1000 | 67.7 | 65.5 | 97.3 | 1.286 | 1.1708 | 0.115 |
| 29c | 100 | 1 | 2000 | 68.4 | 63.2 | 75.1 | 1.3717 | 1.1746 | 0.197 |
| 30c | 100 | 2 | 4000 | 67.9 | 68.6 | 84.1 | 1.459 | 1.1924 | 0.267 |
| 31c | 50 | 2 | 6000 | 65.7 | 79.9 | 71.5 | 1.4691 | 1.2158 | 0.253 |

TABLE 4

| Sample | N2 (cfh) | Air (cfh) | O2 (ppm) | Trans % | Haze % | Clarity % | RI (air side) | RI (film side) | ΔRI |
|---|---|---|---|---|---|---|---|---|---|
| 13d | 100 | 0 | <100 | 53.2 | 92.2 | 98.8 | 1.1632 | 1.1532 | |
| 14d | 100 | 0.5 | 1000 | 53.4 | 92.8 | 98.9 | 1.2166 | 1.1743 | 0.043 |
| 15d | 100 | 1 | 2000 | 53.1 | 93 | 98.9 | 1.2428 | 1.1909 | 0.052 |
| 16d | 100 | 2 | 4000 | 55.3 | 93.7 | 98.6 | 1.3003 | 1.2145 | 0.086 |
| 17d | 50 | 2 | 6000 | 59.9 | 93.7 | 98.6 | 1.439 | 1.238 | 0.201 |

Figure 8C:
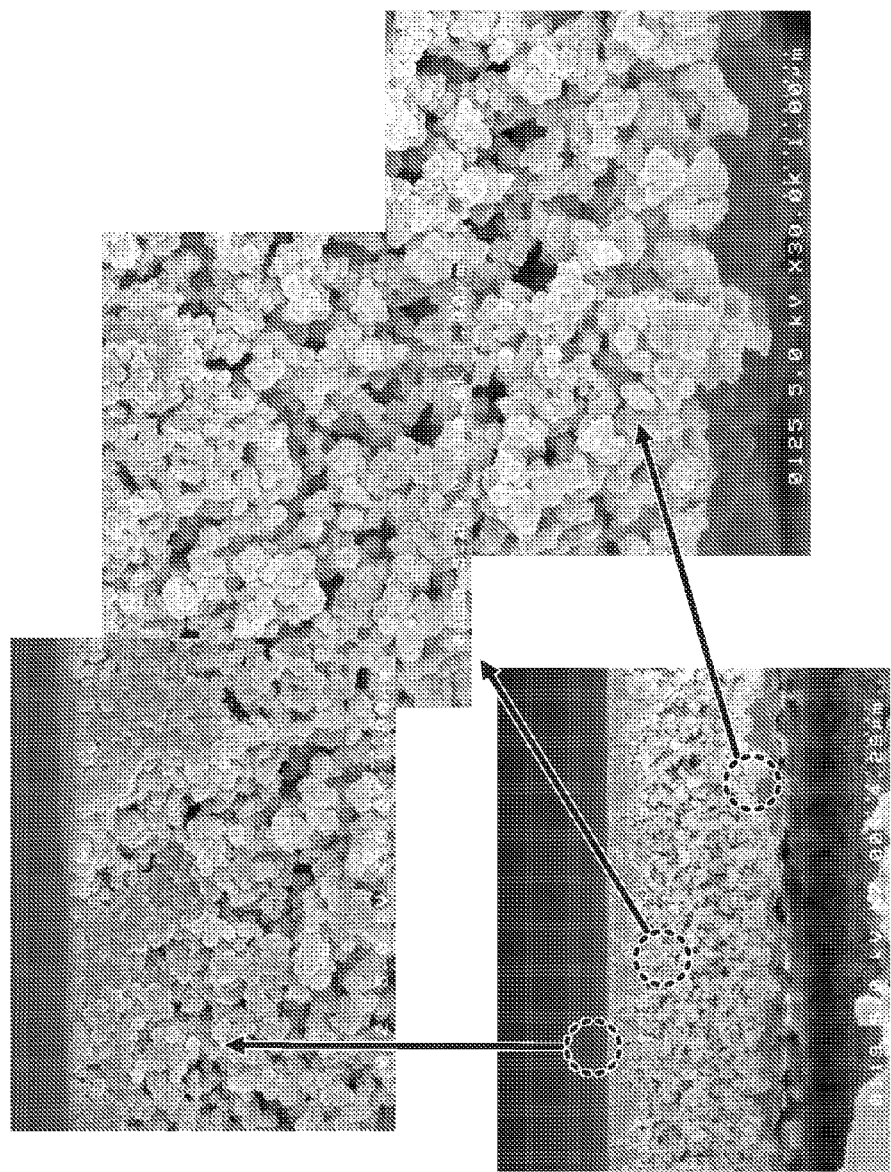

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope. FIG. 8C shows an SEM of sample 17d from Example 8; sample 17d had the largest ΔRI of the samples prepared in Example 8. Larger ΔRI corresponded to a larger difference in the void volume fraction in the two surfaces.

Example 9

PI Primed PET Substrate with Elongated Particle Coating Solution

Coating solution F was coated on the PI primed 2 mil (0.05 mm) PET films according to Example H, with 5 cc/min solution flow rate, the UV-LED (available from Cree, Inc., Durham N.C.) operated at a nominal wavelength of 395 nm, and was run at 13 Amps Optical properties including transmission, haze, clarity, and refractive index (RI) were measured as described elsewhere. Results of the measurements on each of the coatings are summarized in Table 5.

TABLE 5

| Sample | Air (cfh) | O2 (ppm) | Trans % | Haze (%) | RI (air side) | RI (film side) | ΔRI |
|---|---|---|---|---|---|---|---|
| 19 | 0 | <300 | 92.7 | 1.33 | 1.1555 | 1.16 | |
| 21 | 0.5 | 1000 | 92.6 | 1.89 | 1.2258 | 1.1871 | 0.0387 |
| 23 | 1 | 2000 | 92.4 | 1.16 | 1.2525 | 1.2009 | 0.0516 |
| 25 | 2 | 4000 | 91.5 | 2.54 | 1.315 | 1.2261 | 0.0889 |
| 27 | 2 | 6500 | 91.4 | 2.62 | 1.3251 | 1.2248 | 0.1003 |

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A gradient optical film comprising:
    a binder;
    a plurality of elongated particles; and
    a plurality of interconnected voids, wherein a local volume fraction of the plurality of interconnected voids varies along a thickness direction of the gradient optical film, and wherein
    a first local volume fraction of the plurality of interconnected voids proximate a first surface of the gradient optical film is greater than a second local volume fraction of the plurality of interconnected voids proximate an opposing surface of the gradient optical film, and wherein the gradient optical film consists of a single layer with a thickness of not less than 2 microns.

2. The gradient optical film of claim 1, wherein the local volume fraction of the plurality of interconnected voids comprises a minimum local volume fraction or a maximum local volume fraction, along the thickness of the gradient optical film.

3. The gradient optical film of claim 1, wherein the second volume fraction of the plurality of interconnected voids is less than 50% of the first volume fraction of the plurality of interconnected voids.

4. The gradient optical film of claim 1, wherein the second volume fraction of the plurality of interconnected voids is less than 20% of the first volume fraction of the plurality of interconnected voids.

5. The gradient optical film of claim 1, wherein the gradient optical film has a bulk volume fraction of the plurality of interconnected voids that is not less than about 20%, a thickness of the gradient optical film is not less than about 2.5 micron, and an optical haze of the gradient optical film is not greater than about 10%.

6. An optical construction comprising:
    an optical diffuser layer having an optical haze that is not less than about 30%; the gradient optical film of claim 1 disposed on the optical diffuser layer; and a reflective polarizer layer disposed on the gradient optical film, wherein
    substantial portions of each two neighboring major surfaces in the optical construction are in physical contact with each other.

7. The optical construction of claim 6, wherein the gradient optical film is laminated to at least one of the reflective polarizer layer and the optical diffuser layer via an optical adhesive layer.

8. The optical construction of claim 6, wherein the gradient optical film is coated on at least one of the reflective polarizer layer and the optical diffuser layer.

9. A gradient optical film, comprising:
a plurality of elongated particles; and
a plurality of interconnected voids, wherein a local volume fraction of the plurality of interconnected voids varies along a thickness direction of the gradient optical film, and wherein
the gradient optical film has a first index of refraction proximate a first surface of the gradient optical film that is lower than a second index of refraction proximate an opposing surface of the gradient optical film, wherein the first index of refraction is not greater than about 1.3, and wherein the gradient optical film consists of a single layer with a thickness of not less than 2 microns.

10. The gradient optical film of claim 9, wherein the local volume fraction of the plurality of interconnected voids comprises a minimum local volume fraction or a maximum local volume fraction, along the thickness of the gradient optical film.

11. The gradient optical film of claim 9, wherein the second volume fraction of the plurality of interconnected voids is less than 50% of the first volume fraction of the plurality of interconnected voids.

12. The gradient optical film of claim 9, wherein the second volume fraction of the plurality of interconnected voids is less than 20% of the first volume fraction of the plurality of interconnected voids.

13. The gradient optical film of claim 9, wherein the second volume fraction of the plurality of interconnected voids is less than 10% of the first volume fraction of the plurality of interconnected voids.

14. An optical construction, comprising:
a structured surface comprising a plurality of structures; and
a gradient optical film coated on and substantially planarizing the structured surface, the gradient optical film comprising:
a plurality of interconnected voids, wherein a local volume fraction of the plurality of interconnected voids varies along a thickness direction of the gradient optical film, and wherein
a first local volume fraction of the plurality of interconnected voids proximate the plurality of structures is greater than a second local volume fraction of the plurality of interconnected voids proximate an opposing surface of the gradient optical film, and wherein the gradient optical film consists of a single layer with a thickness of not less than 2 microns.

15. The optical construction of claim 14, wherein the gradient optical film further comprises an index proximate the plurality of structures that is not greater than about 1.3.

16. The optical construction of claim 14, wherein the gradient optical film further comprises an optical haze that is not greater than about 10%.

* * * * *